US007079024B2

(12) United States Patent
Alarcon

(10) Patent No.: US 7,079,024 B2
(45) Date of Patent: Jul. 18, 2006

(54) ALERT SYSTEM FOR PREVENTION OF COLLISIONS WITH LOW VISIBILITY MOBILE ROAD HAZARDS

(76) Inventor: Ramon Alarcon, 3553 Golden State Dr., Santa Clara, CA (US) 95051

( * ) Notice: Subject to any disclaimer, the term of this patent is extended or adjusted under 35 U.S.C. 154(b) by 223 days.

(21) Appl. No.: 10/851,415

(22) Filed: May 21, 2004

(65) Prior Publication Data

US 2004/0263330 A1 Dec. 30, 2004

Related U.S. Application Data

(60) Provisional application No. 60/473,022, filed on May 23, 2003.

(51) Int. Cl.
*G08B 1/08* (2006.01)
*H04Q 7/00* (2006.01)

(52) U.S. Cl. .................. 340/539.11; 340/901; 340/904

(58) Field of Classification Search ........... 340/539.11, 340/901, 904, 944, 435, 436, 463
See application file for complete search history.

(56) References Cited

U.S. PATENT DOCUMENTS 3,967,575 A * 7/1976 Coutts ...................... 116/35 A
4,196,412 A * 4/1980 Sluis et al. ................. 340/901
6,292,112 B1 * 9/2001 Bader et al. ................ 340/941
6,411,896 B1 * 6/2002 Shuman et al. ............. 701/209
6,469,628 B1 * 10/2002 Richards et al. ......... 340/573.3
6,731,202 B1 * 5/2004 Klaus ...................... 340/425.5
6,759,948 B1 * 7/2004 Grisham et al. ............ 340/435
6,917,284 B1 * 7/2005 Grisham et al. ............ 340/435

* cited by examiner

*Primary Examiner*—John Tweel, Jr.
(74) *Attorney, Agent, or Firm*—Dechert LLP; Guadalupe Garcia

(57) ABSTRACT

A presence detection system comprising, among other things, a radio transmitter and receiver is described herein. The transmitter includes a motion detection circuit, a microprocessor, and a radio frequency modulator. The motion detection circuit is configured to direct a motion detected signal to the microprocessor upon the transmitter being moved in a predetermined manner. The microprocessor is configured to generate an encoded message that includes a preamble denoting a beginning of the encoded message, an identification code denoting a type of transmitter, and a check message (such as a checksum) containing information about content of the encoded message. Finally, the radio frequency modulator is configured to modulate the encoded message at a transmitting frequency.

35 Claims, 24 Drawing Sheets

Signal based responsiveness

Time domain based responsiveness

| | | |
|---|---|---|
| Level 1 / Level 1 | Level 1 / Level 2 | Level 1 / Level 3 |
| Level 2 / Level 1 | Level 2 / Level 3 | Level 2 / Level 3 |
| Level 3 / Level 1 | Level 3 / Level 2 | Level 3 / Level 3 |

Highest Responsiveness Level

Lowest Responsiveness Level

FIG. 17

ALERT SYSTEM FOR PREVENTION OF COLLISIONS WITH LOW VISIBILITY MOBILE ROAD HAZARDS

CROSS REFERENCE TO RELATED APPLICATIONS

This application claims the benefit of U.S. Provisional Application No. 60/473,022, filed May 23, 2003.

FIELD OF THE INVENTION

The present invention relates generally to vehicular collision avoidance systems. More particularly, the present invention relates to devices for the detection of low visibility units, such as bicycles or pedestrians, that may be present in areas of automobile traffic.

BACKGROUND OF THE INVENTION

About 85 million adults and children ride their bikes every year. For children and teens, the bicycle is a primary means of transportation when traveling independently. Each morning, an estimated half million people bicycle to work in the United States. However, injuries occur. Each year, more than 500,000 bicyclists sustain a cycling injury that requires emergency department care. Many of these injuries are cause by traffic accidents. About 94% of all cycling fatalities are the result of traffic crashes. Not surprisingly, more than half of the bicyclists riding in or near traffic report feeling unsafe.

In order to combat this, cycling advocacy groups teach riding techniques designed to minimize the chance of accidents with motorists. These include wearing brightly colored clothing, riding in the appropriate lane in a predictable manner, and using lights at night. The majority of these precautions, and indeed most safety products currently sold in the industry, are designed to increase the probability that motorists will see cyclists.

Despite such precautions and safety products, many traffic accidents still occur. In a large number of cases the accident is caused because the motorist did not see the cyclist. Even a cyclist wearing bright clothing on a sunny day can go unseen by motorists. The causes range from visual obstructions to cockpit distractions. Bright glare on a windshield, a car parked in the bike lane, and a blind curve are just a few examples of physical situations that limit a motorist's ability to see even the most brightly attired cyclists. The problem is especially acute for bus and truck drivers because the large size of their vehicles creates many "blind spots." Driver distractions such as mobile phones, heavy traffic conditions, and day dreaming can also cause motorists to overlook cyclists. In addition to accidents caused by motorists, a number of accidents can be attributed to cyclists, particularly children and teens, who do not obey traffic rules and do not practice safe cycling techniques. In many of these cases, the cyclists put themselves into positions where they cannot be seen by motorists in time to avoid accidents.

The fact that so many bicycle traffic accidents still occur suggests that relying on motorists' vision to avoid traffic accidents is not sufficient. To date, motorists have not had access to devices that would compliment their visual senses and help avoid accidents. Likewise, cyclists have not had access to devices that help them become more identifiable to motor vehicle traffic when visual obstructions and distractions are present. While cyclists suffer acutely from the above problems, other people including joggers, motorcyclists, roller skaters, and pedestrians are affected by the above described problems and suffer from the same lack of solutions. As such, people who use the roadways need a new type of collision avoidance system that will allow motorists to detect the presence of cyclists and other low visibility road hazards even when visual obstructions and distractions are present.

BRIEF SUMMARY OF THE INVENTION

A presence detection system comprising, among other things, a radio transmitter and receiver is described herein. In an embodiment of the invention, the transmitter includes a motion detection circuit, a microprocessor, and a radio frequency modulator. In this embodiment, the motion detection circuit is configured to direct a motion detected signal to the microprocessor upon the transmitter being moved in a predetermined manner. The microprocessor is configured to generate an encoded message that includes an identification code denoting a type of transmitter. Finally, the radio frequency modulator is configured to modulate the encoded message at a transmitting frequency.

In another embodiment of the invention, the receiver includes a radio frequency receiver, a microprocessor, and an output. In this embodiment, the radio frequency receiver receives the encoded message at the transmitted frequency. Also, the microprocessor is configured to determine the identification code. Finally, the output is configured to alert a user of the presence of the transmitting unit.

In an embodiment of the invention, the transmitting unit is affixed to a low visibility unit such as a bicycle that uses roads that an automobile may also use. In such an embodiment, the receiving unit is preferably affixed to the automobile. In this way, the receiving unit can be configured to provide audio or visual output to a driver of the automobile so as to alert the driver of the presence of the low visibility unit which he may not have otherwise perceived. Thus, the present invention raises the awareness of drivers to others that may be simultaneously using the road such that accidents can be avoided.

Other embodiments of the invention implement motion detection circuitry within the transmitting unit so as to improve the operating life provided by limited electrical power, such as that provided by batteries. Toward also improving the operating life of the transmitting unit, other sources of replenishable power can be used such as obtained through photovoltaic cells or electromechanical generators. Many other embodiments will be provided in the following detailed description.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 1 depicts an application of a presence detection system, according to an embodiment of the present invention.

FIG. 17 is an illustration of a signal and time based responsiveness of a receiver according to an embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the relevant arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. The ensuing description provides further examples of the invention.

Figure 1:
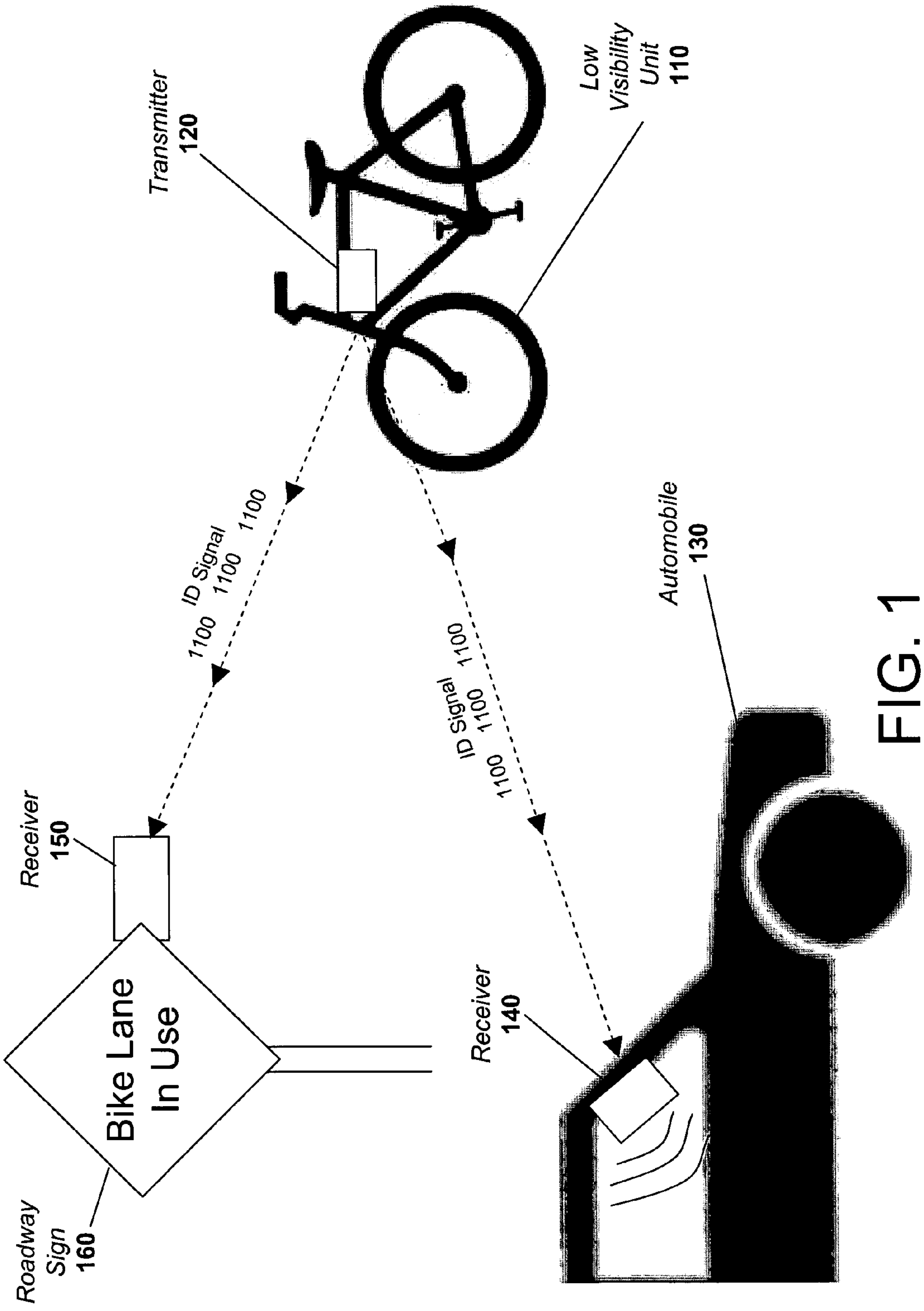
FIG. 1 shows a presence detection system, according to an embodiment of the invention.

FIG. 1 depicts an illustration of the presence detection system, according to an embodiment of the invention. By way of example to illustrate some general principles and architecture of the invention, the presence detection system comprises transmitter 120, which may be mounted to low visibility unit 110 such as a bicycle; and receiver 140, which may be located in automobile 130. Transmitter 120 broadcasts, among other things, an identification signal using radio frequency technology. Receiver 140 receives, among other things, the identification signal and displays a corresponding alert message. In another embodiment, a specialized receiver 150 is mounted to a roadway sign 160 capable of producing an alert in response to the command of the receiver 150.

In an embodiment of the invention, transmitter 120 is mechanically fastened to a low visibility unit 110. Moreover, transmitter 120 may be a self-contained device or it may be integrated into other low visibility unit 110 components. For example, where low visibility unit 110 is a bicycle, transmitter 120 may be implemented in a cyclometer. Advantages may exist in integrating the present invention within a cyclometer. For example, overall system costs may be reduced because existing cyclometers may already have built-in motion sensing capabilities such as is utilized within the present invention. Transmitter 120 is preferably mounted in an elevated location on low visibility unit 110. For example, where low visibility unit is a bicycle, transmitter 120 is preferably mounted on the handlebars, stem, or head tube in order to minimize obstructions of the transmitted signal.

In other embodiments, transmitter 120 may implement either an internal or an external antenna that take into consideration the transmission characteristics of the antenna. The nature of most real-world antennas is such that the radiated power is not equal in all directions. Because of this, transmitter 120 is preferably mounted in such a way so that the antenna to maximize the power radiated in the plane parallel to the ground (i.e., earth, not electrical ground). Within this constraint, the transmitter device is preferably mounted so that the maximum power radiated from the antenna is in the direction of travel of low visibility unit 110. In this way, radiated RF signals are most strongly directed collinear to the direction of travel. Indeed, this is preferred as it is most likely that a hazard will be presented in this direction, such as by automobile 130.

In an embodiment of the invention, the antenna of transmitter 120 is implemented as a ¼ wave whip style antenna that offers an adequate combination of uniform performance in a plane, size, and ease of design. In embodiments where cost and size are significant considerations, the antenna is implemented as a PCB trace loop antenna at reduced uniform transmission in a plane and, to a lesser degree, ease of design.

Within low visibility unit 110, electrical power may be a resource that needs to be conserved. For example, where batteries are used within low visibility unit 110, it is desirable to conserve power thereby increasing the usable operation of the present invention including transmitter 120. Accordingly, full power operation of transmitter 120 may be reduced in certain embodiments. For example, the operation of transmitter 120 may be automatically triggered by a motion detection circuit that provides input to a local microprocessor. In this way, movement of low visibility unit 110 initiates operation of transmitter 120. In an embodiment, this motion detection circuit may include an accelerometer. The output of the accelerometer is connected to a circuit that produces an output responsive to the rate of change of the input signal. The output of a rate of change circuit that is preferably connected to a “wake up” input pin of a local microprocessor. In this embodiment, when the rate of change of the accelerometer signal rises above a predetermined level, the microprocessor will “wake up” from a low power sleep mode. By making use of such an accelerometer output signal that is directed through a rate of change circuit, inadvertent accelerometer signals that do not correspond to movement will not cause the processor to wake up unintentionally. For example, inadvertent accelerometer signals may be caused by signal offset, temperature drift, and noise.

When the microprocessor of transmitter 120 “wakes up” from the low power sleep mode, it activates an RF transmitter circuit. In an embodiment, the RF transmitter circuit may transmit on a single frequency or it may alternatively broadcast on two or more frequencies. In a preferred embodiment, the RF transmitter circuit operates on a single frequency in the unlicensed 902 MHz to 928 MHz band. Once the RF transmitter circuit has been activated by the microprocessor, the microprocessor then commands the broadcast of identification messages via the RF transmitter circuit. There are many low cost “radio on a chip” ICs on the market today that provide good data transmission and/or reception while requiring almost no additional signal conditioning or filtering. It is preferable to use one of these ICs in conjunction with the microprocessor. In order to maximize the distance from which the signal may be received while still complying with FCC Part 15 regulations, the transmitter 120 may be configured to use the ON/OFF Key transmission technique as is known in the art. Using this method will take advantage of the “averaging” provision of the FCC regulation that averages the power transmitted over a period of time.

According to the present invention, transmitter 120 may be used to transmit, among other things, an identification message that identifies low visibility unit 110 as a particular type. For example, predetermined identification signals may identify low visibility unit 110 as a bicycle, a jogger, a pedestrian, a horse, or a scooter. The identification message consists of several data elements arranged in a predetermined manner. In an embodiment, a first portion of the message is a pre-amble. Another portion of the identification message contains a unique data code that uniquely corresponds to the type of low visibility unit to which the transmitter is attached. Once the identification message is broadcast, the microcontroller turns off the transmitter 120 in order to conserve power and waits for a prescribed period of time. This wait period is preferably long enough to conserve significant power, yet short enough so ensure that ample time is allowed to alert approaching receivers 140 to the presence of the low visibility mobile road hazard. It has been found that a wait period of 100 ms to 200 ms provides ample power savings while ensuring the identification message is broadcast frequently enough to provide appropriate warning.

The cycling of a message transmission followed by a wait period preferably continues indefinitely until motion is no longer detected by the motion detection circuit, indicating that the low visibility mobile road hazard is no longer in use. So as to provide an added level of safety, however, it is preferred to have transmitter 120 broadcast identification messages for a predetermined time (e.g., a timeout period) after motion is no longer detected and, in this way assure, that protection is adequately provided. Such time is preferably about 2 minutes. This provision allows for momentary stops of low visibility unit 110, for example, at traffic signs or for short breaks. In this way, receiver 140 mounted in automobile 130 can alert the presence of the low visibility unit 110 because its transmission has not ceased. After the timeout period lapses, the microcontroller commands the entire transmitter device to enter into a low power state. The cycle of operation is again initiated once motion is detected.

In order to achieve indefinite operation, the transmitter may be powered by an internal battery that is charged by a photovoltaic cell. This addresses the possibility that users may not be inclined to change or manually charge batteries. Moreover, other users may not be able to replace the batteries such as young children. Additionally, it is anticipated that adult users may not replace batteries because the transmitter 120 does not produce a visually perceivable benefit such as a visible beam of light for illuminating the road.

A further consideration when implementing the present invention is that low visibility units 110 such as bicycles are often transported within automobiles. Since the alert system according to this invention is automatically triggered by a motion sensor, it is likely that unwanted broadcast of identification messages would occur. Such unwanted transmissions would have the effect of disrupting the operation of other’s usage. Such unwanted transmissions would also trigger unintentional alerts in other automobiles equipped with receivers. In order to address this concern, transmitter 120 is preferably equipped with a disable function. The most straightforward way to implement this is with a mechanical switch that temporarily disables transmissions while low visibility unit 110 is being transported. However, it is important that transmissions resume when low visibility unit 110 is removed from the automobile. In order to accomplish this, an algorithm that automatically resets the disable switch after motion has ceased for some period of time may be also be implemented, for example, in firmware. This period of time is preferably long enough to account for stopping at traffic signals, yet not so long as to allow the low visibility unit to exit the automobile and initiate normal usage.

An alternative to a mechanical disable switch is a firmware algorithm. For example, where low visibility unit 110 is a bicycle, the algorithm can detect the difference between a bicycle being ridden by a cyclist and a bicycle being carried by a carrier. While being ridden, a bicycle experiences several characteristic motions. One motion is a slight side to side motion caused by the rider's pedal strokes. This motion is typically between 60 and 120 rpm, corresponding to the pedal cadence. The other motion is in the forward direction produced by the pedal strokes. Distinct from these motions are the motions experienced by the bicycle when being carried by a bicycle carrier. Many bicycle carriers mount the bicycles transverse to the direction of travel of the automobile. This means that the primary motion experienced by bicycles when being carried by most bicycle carriers, is perpendicular to the bicycle. Therefore, it is possible to construct a firmware algorithm that compares the measured motions to the motions known to characterize being ridden and make a determination as to whether or not the transmitter device should transmit messages.

Receiver 140 is configured to receive, among other things, the identification messages that are broadcast by transmitter 120. In a preferred embodiment, receiver 140 is mounted in the passenger compartment of automobile 130. Two recommended locations are on the windshield or on the top portion of the dash panel. It is preferable that receiver 130 be mounted as high as possible so as to provide the most direct path to receive the identification message signal. Receiver 140 is mounted in such a way that the antenna will is oriented to maximize responsiveness to signals radiated in the plane parallel to the ground (i.e., earth, not electrical ground). Within this constraint, receiver 140 is mounted so that the maximum responsiveness of the antenna is in the direction of travel of the automobile. This is because the automobile is most likely to collide with objects that are in, or moving toward its forward path. In application, a ¼ wave whip style antenna offers an adequate combination of uniform performance in a plane, size, and ease of design.

Receiver 140 is comprised of a microprocessor, local memory, RF receiver circuit, audio circuitry including an audio transducer, user input, user display, and means to store electrical energy. The RF receiver circuit is configured to be responsive to signals broadcast by transmitter 120. There are low cost "radio on a chip" ICs on the market that provide adequate data reception while requiring limited additional signal conditioning or filtering. Such chips allow the low visibility mobile road hazard alert system designer to design for wireless data reception without having to have expert level knowledge in RF circuits. It is preferable to use one of these ICs in the design.

The microprocessor is connected to the output of the RF receiver circuit. The microprocessor listens for valid signals and decodes incoming messages. If the microprocessor determines that an incoming message is valid, it then attempts to match the identification portion of the message to one of a plurality of ID codes stored in local memory. When a match occurs, the microprocessor selects the appropriate audio alert message from memory and commands the audio circuit to generate a corresponding audible alert in order to alert the user of the receiver device to the presence of the low visibility mobile road hazard. In the preferred embodiment, the audible alert is a combination of alert tones and natural voice recordings which indicate the nature of the hazard. A user input is provided to allow the user of receiver 140 to adjust the volume of the audible alert. The user display may utilize one or more LED's in conjunction with the audible alerts to further alert the driver as to the presence of low visibility unit 110. The LED's may also indicate the operational state of the receiver device.

In a preferred embodiment, receiver 140 is recharged by an energy harvesting device such as a photovoltaic cell. Under normal conditions, recharging provides sufficient energy to allow receiver 140 to remain on at all times. However, scenarios exist where the opportunity to recharge the batteries would be limited. Such a scenario may be a user who usually drives at night and parks their automobile in an enclosed garage. Such a situation necessitates power management in order to ensure that the receiver device is on when the user is driving. In a preferred embodiment, power management is accomplished in conjunction with a motion detection circuit whereby signals from the motion detection circuit are directed to the microprocessor. The microprocessor is then able to use this information to determine when to power down the circuit and conserve energy. As discussed with reference to transmitter 120, it is also desirable to have receiver 140 continue operation for a predetermined length of time after motion has ceased. For example, receiver 140 may continue to listen for identification messages for a short period of time, a "timeout" period, after motion has ceased. It has been found that a reasonable time-out time would be about 2 minutes. In this way, the situation where automobile 130 stops momentarily at a traffic signal but will resume motion when the traffic signal changes does not incorrectly disable receiver 140. Another example is when a person parks automobile 130—receiver 140 is no longer in motion, yet the driver may wish to be alerted to approaching hazards that could be hit as the driver opens the automobile door.

Figure 2:
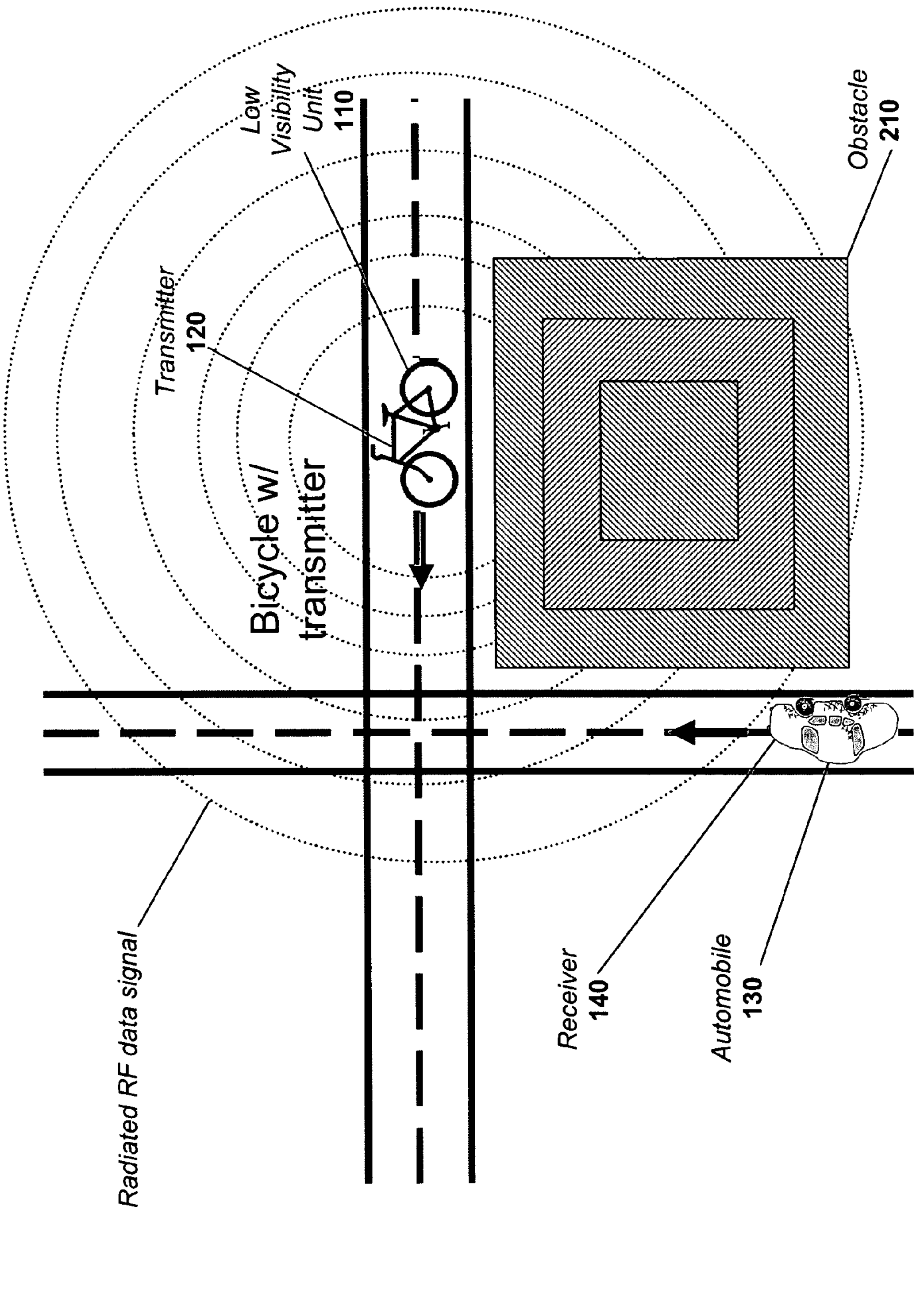
FIG. 2 provides an illustration of an operational scenario of the presence detection system according to an embodiment of the present invention.

FIG. 2 illustrates how such the present invention operates to alert a motorist in automobile 130 to the presence of low visibility unit 110 such as a bicycle. As shown, low visibility unit 110 and automobile 130 are traveling on intersecting paths. Further as shown, obstacle 210, such as a building or parked automobile, precludes the driver of automobile 130 from seeing low visibility unit 110. With the presence detection system employed, receiver 140 alerts the motorist in automobile 130 to the presence of low visibility unit 110 before a line of sight is possible.

Figure 3A:
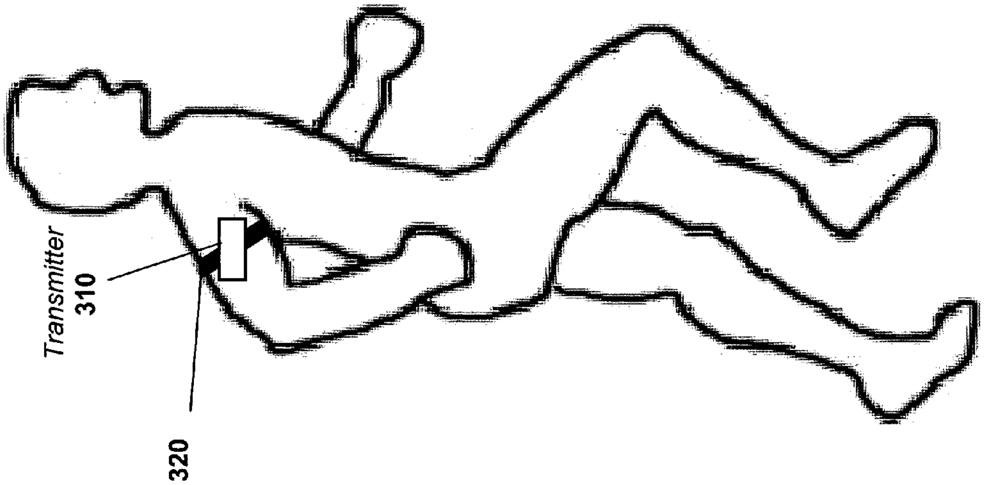
FIGS. 3*a* and 3*b* provide an illustrations of an operational scenario of a transmitter according to an embodiment of the present invention.

The present invention with its various components can be implemented in various form factors. For example, as already discussed, receiver 120 can be implemented as part of a cyclometer. Moreover, receiver 140 can be implemented in different forms within automobile 130, including, for example, within the radio and its corresponding antenna. Many other form factors exist without deviating from the teachings of the present invention. FIG. 3*a* depicts an illustration of transmitter 120, according to an alternate embodiment of the invention. By way of example to illustrate some general principles, the embodiment comprises a specialized transmitter 310 which is attached to the body of a pedestrian or jogger via a fastener 320. The composition and function of the transmitter 310 is substantially similar to that of the transmitter 120 described herein. The form of the transmitter 310, however, is specialized to accommodate for mounting to the body via fastener 320. The program instructions and identification message, the motion detection circuitry, and the placement of the antenna are optimized for the application of the jogger. In the embodiment of FIG. 3*a*, the identification code that is broadcast by the transmitter 310 is unique to the jogging (or pedestrian) application.

Figure 3B:
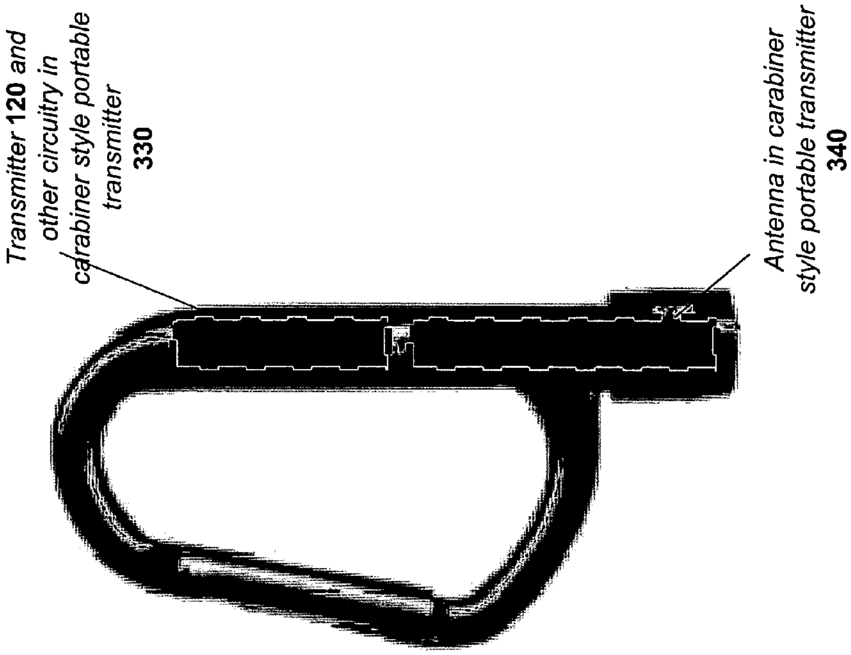

FIG. 3*b* depicts an illustration of an alternative embodiment of the transmitter device. This device is similar to a karabiner commonly used in camping. It affords for easy attachment to belt loops, back packs, and many other types of clothing or accessories. Transmitter 120 and other circuitry 330 and batteries are contained inside the karabiner. In an embodiment, the karabiner further includes the transmitting antenna 340.

Figure 4:
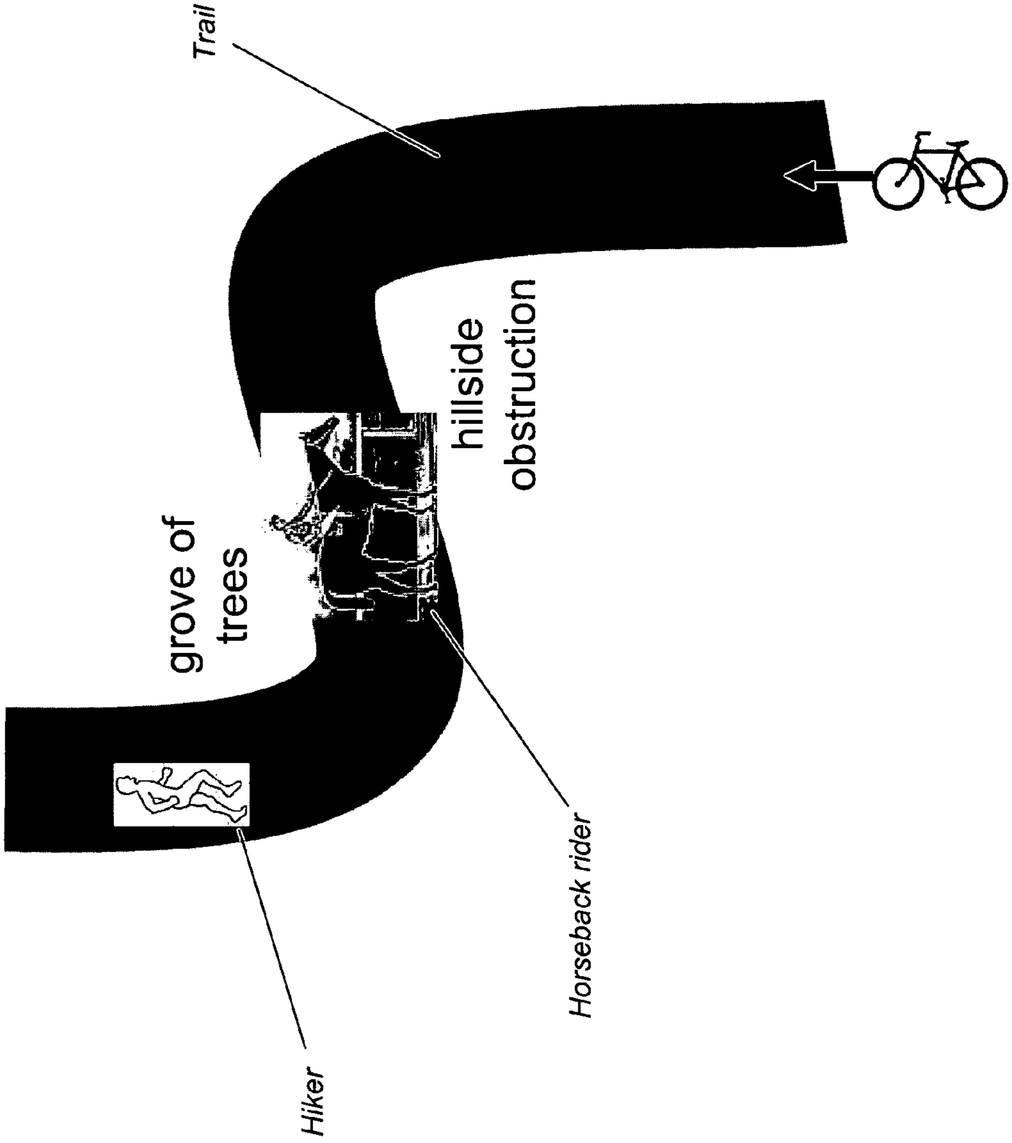
FIG. 4 provides an illustration of an operational scenario of the presence detection system according to an embodiment of the present invention.

As FIG. 3*a* and FIG. 3*b* demonstrates, transmitter 120 may be specialized for a particular application. There are a number of other applications where the design illustrated in FIG. 5 (to be described below) may be specialized in a similar manner. These applications include, but are not limited to roller skates, motorcycles, horseback riders, automobiles, farm animals, animal drawn carts, and scooters. As shown in FIG. 4, the present invention allows for the coexistence of various implementations. As shown, mountain bikers, hikers, and equestrians that share a trail may each have their own transmitter with its unique identification code. In the scenario shown, it is possible for hikers or equestrians to be startled by the sudden appearance of a mountain bike on such a shared trail. Collisions can occur and horses can be spooked. The present invention can be further configured to provide advanced warning of approaching hazards to hikers, equestrians, and even mountain bikers. To address this concern, it may be desirable for the function provided by the transmitter device and the receiver device to be integrated into a single unit. Such would be within the scope of the present invention.

Figure 5:
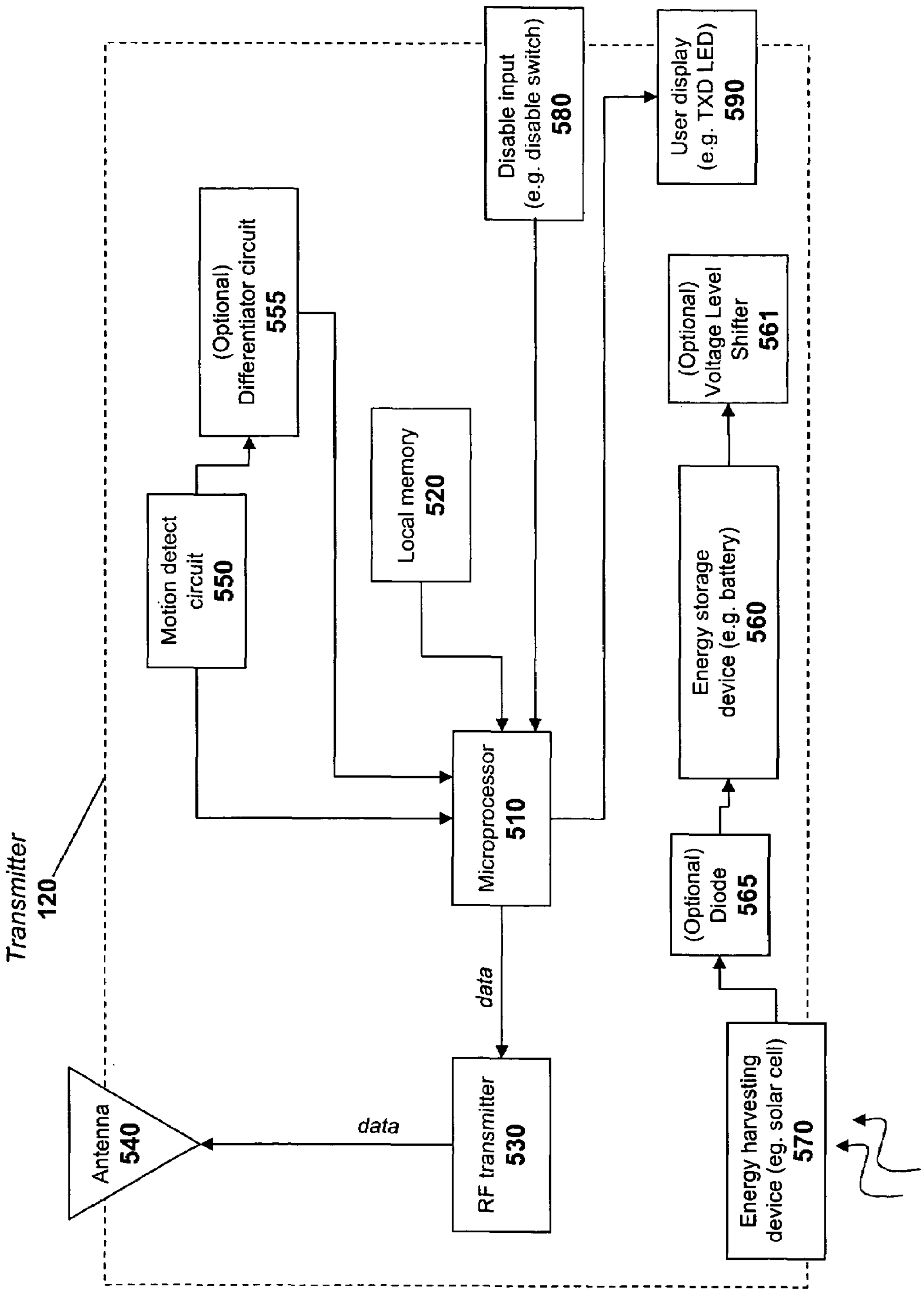
FIG. 5 is a block diagram of a transmitter according to an embodiment of the present invention.

FIG. 5 depicts a schematic illustration of presence detection transmitter 120, according to an embodiment of the invention. By way of example to illustrate some general principles and architecture of the invention, transmitter 120 comprises a local microprocessor 510 which may execute instructions that reside in local memory 520; RF transmission circuitry 530 capable of producing radio frequency waves of a given frequency and magnitude in response to the commands of local microprocessor 510; antenna 540 designed for the optimal transmission of radio frequency waves at the specified frequency; motion detection circuitry 550 which generates signals in response to movement in a given direction; energy storage device 560 such as a battery capable of supplying power to the components of transmitter 120; energy collection device 570 such as a photovoltaic cell, capable of charging energy storage device 560 when in the presence of light energy; user input 580 such as a disable switch, which may be used by the operator to disable the transmission of the identification signal; and user display 590, such as one or more light emitting diodes, for the purpose of informing the user of the operation status of transmitter 120.

In one embodiment, microprocessor 510 executes instructions in the form of a program which resides in local memory 520. This local memory 520 may be a separate component or may be integrated directly into microprocessor 510. Microprocessor 510 operates in a low power state while monitoring the motion detection circuitry 550 for a signal which indicates motion. Once motion is detected, microprocessor 510, then commands RF transmission circuitry 530 to exit a low power state and into a fully powered mode. Microprocessor 510 then sends data that constitutes an identification signal to RF transmitter 330 which is then broadcast via antenna 540. In an embodiment of the invention, antenna 540 is a dipole antenna, however, that can be configured to generally direct its strongest signal in a forward and backward direction, collinear with a direction of movement.

In order to minimize power consumption, microprocessor 510 may repeatedly cycle components of transmitter 120 into a low power state where no RF transmission occurs for some period of time determined by the instructions in local memory 520. This period of time, however, should be sufficiently short so as not to negatively impact the ability of the system to provide alerts to the operator of automobile 130 in a timely manner. This cycle of RF transmission and low power states repeats until no further signal is generated by motion detection circuitry 550. At such time, microprocessor 510 will continue the cycle of RF transmission for a predetermined period of time as stored in instructions in local memory 520. This predetermined period of time is preferably sufficiently long so as to continue the broadcast of identification signals during situations where no movement is present, but the presence detection of low visibility unit 110 would still be desirable to the operator of the low visibility unit 110 and or the operator of the automobile 130. An example of such a situation is momentarily stopping the low visibility unit 110 at a traffic signal.

It should be noted that electronic components that incorporate the function of both microprocessor 510 and RF transmission circuitry 530 are becoming more readily available in the marketplace. It will be obvious to those of skill in the art that the function described above can be implemented using different components as they become available without changing the nature of the invention. But in any case, the scope of the presently described inventions shall be measured by the scope of the claims below.

In an embodiment of the invention, user input 580 is used by the operator of the low visibility unit 110 to disable the transmission of the identification signal. This may be desirable when low visibility unit 110 is mounted to an automobile for the purpose of transporting low visibility unit 110 to a different location. However, an alternative embodiment exists where microprocessor 510 employs algorithms stored in local memory 520 to analyze the signal generated by motion detection circuitry 550 and determine whether the motion is due to the normal operation of low visibility unit 110 or the transportation of low visibility unit 110 by another vehicle. If microprocessor 510 determines the motion to be caused by the normal operation of low visibility unit 110, microprocessor 510 would then initiate the normal identification signal transmission cycle. If not, microprocessor 510 would keep transmitter 120 in a low power state.

In one embodiment, transmitter 120 is powered by an energy storage device 560. Energy storage device 560 is charged by an energy collection device 570 such as a photovoltaic cell. If a photovoltaic cell is used, diode 565 is preferably placed between energy storage device 560 and energy harvesting device 570 in order to ensure that current from the energy storage device 560 does not flow backward through the energy harvesting device 570 when the transmitter 120 is in an environment without light. An alternative embodiment exists where an energy collection device 570 is not incorporated into transmitter 120. In such a case, energy storage device 560 may need to be periodically replaced by the user. In yet another embodiment, voltage level shifter 561, commonly a charge pump or voltage regulator, can be used to raise or lower a voltage being supplied by energy storage device 560 in order to meet the operational voltage needs of the circuitry incorporated into transmitter 120.

An alternative embodiment exists where energy storage device 560 is not incorporated into transmitter 120. In such an embodiment, power is delivered to transmitter 120 via a connection to an external power source such as a generator which is driven by a moving component of the low visibility unit 110. Where low visibility unit 110 is a bicycle, the generator may be powered by the wheels, gears, or pedals of the bicycle. In such an embodiment, power regulation circuitry may need to be incorporated into transmitter 120 in order to allow its components to function properly. As discussed above, voltage level shifting, either up or down, can be implemented as an embodiment of the present invention.

Figure 6:
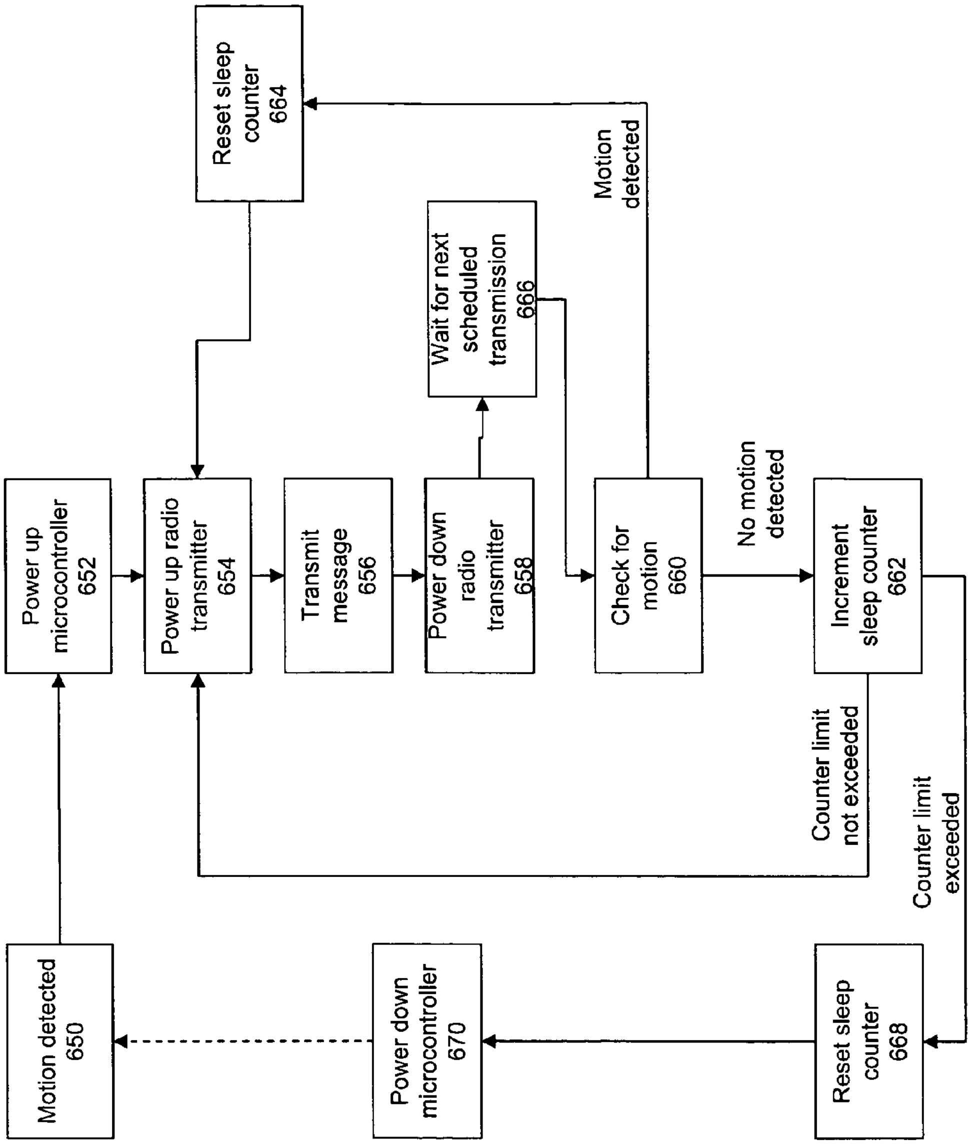
FIG. 6 is a flow block depicting the operation of a transmitter according to an embodiment of the present invention.

FIG. 6 depicts an illustration of a method implemented by transmitter 120, according to an embodiment of the invention. By way of example to illustrate some general principles and architecture of the invention, the microcontroller is powered up (652) when the motion detection circuit (650) causes a pin on the microcontroller to transition logic levels. The microcontroller then commands the RF transmitter circuit to power up (654) and transmit (656) the identification message. Once the transmission is complete, the microcontroller commands the RF transmitter circuit to turn off (658). At this point, the microcontroller waits for the next scheduled transmission (666). The wait time may be the same every time through the execution loop, 100 ms, for example, or it may vary according to a pre-defined schedule. After the wait state is complete, the microcontroller checks for motion (660) to determine if transmitter device 120 is still in use. If motion is detected, the sleep counter is reset (664) and the microcontroller again commands the RF transmitter circuit to power up (654) and repeat the identification message broadcast (656). If no motion is detected, the algorithm attempts to determine if it is time to put the transmitter device into a low power sleep state. This is done via a sleep counter (662). The sleep counter limit should correspond to approximately 2 minutes in order to accommodate for bicycles stopped at traffic signals. If the sleep counter limit has not been exceeded, then the microcontroller repeats the identification message broadcast loop (654, 656, . . . ). However, if the sleep counter limit is exceeded, then the counter is reset (668) and the microcontroller enters into a low power sleep mode (670) until the next time it is woken up by movement.

Figure 7:
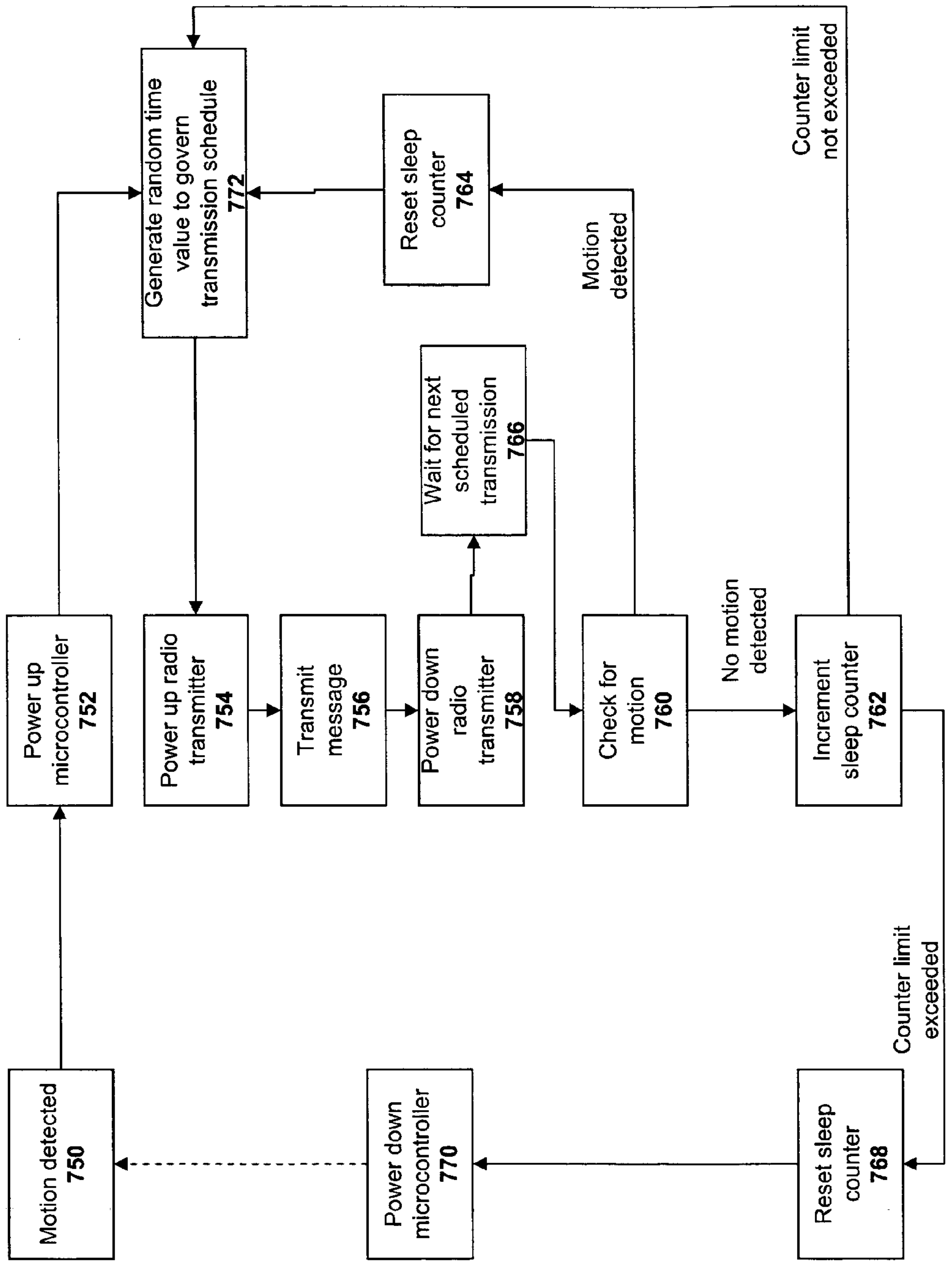
FIG. 7 is a flow block depicting the operation of a transmitter according to an embodiment of the present invention.

FIG. 7 depicts an illustration of an alternative method implemented by the transmitter device 120, according to an embodiment of the invention. By way of example to illustrate some general principles and architecture of the invention, this method is similar to that described in FIG. 6. The primary difference in this method is that the duration of the wait state (766) is not constant nor does it follow a predetermined schedule. In this method, the duration of the wait state is set for random length within certain predetermined upper and lower bounds (step 772). Example upper and lower bounds may be 200 ms and 50 ms respectively. The reason to randomize the duration of the wait period is to accommodate for the presence of multiple transmitter devices 120. If a large group of low visibility units 110 are traveling together and are all using their own transmitter 120, it is possible that the signals would overlap, confusing any nearby receiver 140. By randomizing the duration of the wait state, the likelihood that identification messages will be received without interference or overlap is increased. When using this method, it is best to determine the wait state duration before each message is broadcast. This allows the transmitter device to broadcast information about the wait state, enabling receiver devices to know when to expect the next transmission and to accordingly do better power management and error rejection.

Figure 8:
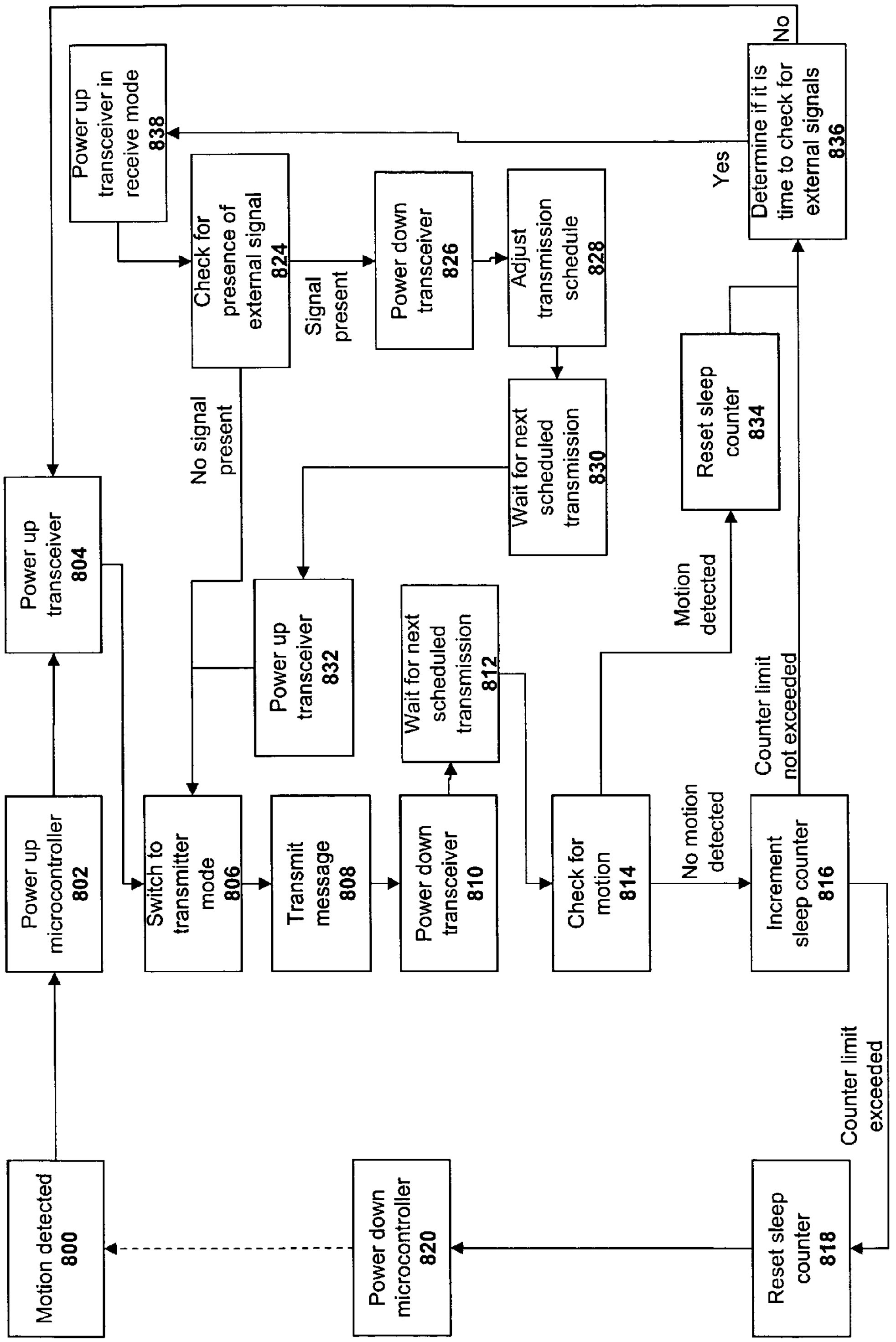
FIG. 8 is a flow block depicting the operation of a transmitter according to an embodiment of the present invention.

FIG. 8 depicts an illustration of an alternative method implemented by transmitter 120, according to an embodiment of the invention. In this implementation, transmitter 120 also has a receiver 140 capable of listening for messages from other transmitters 120. The method is similar to that described in FIG. 6. The primary difference is that the duration of the wait state is adjusted (828) if other signals are detected (824). By adjusting the wait state, it can be ensured that the messages can be broadcast without interference or overlap.

Figure 9A:
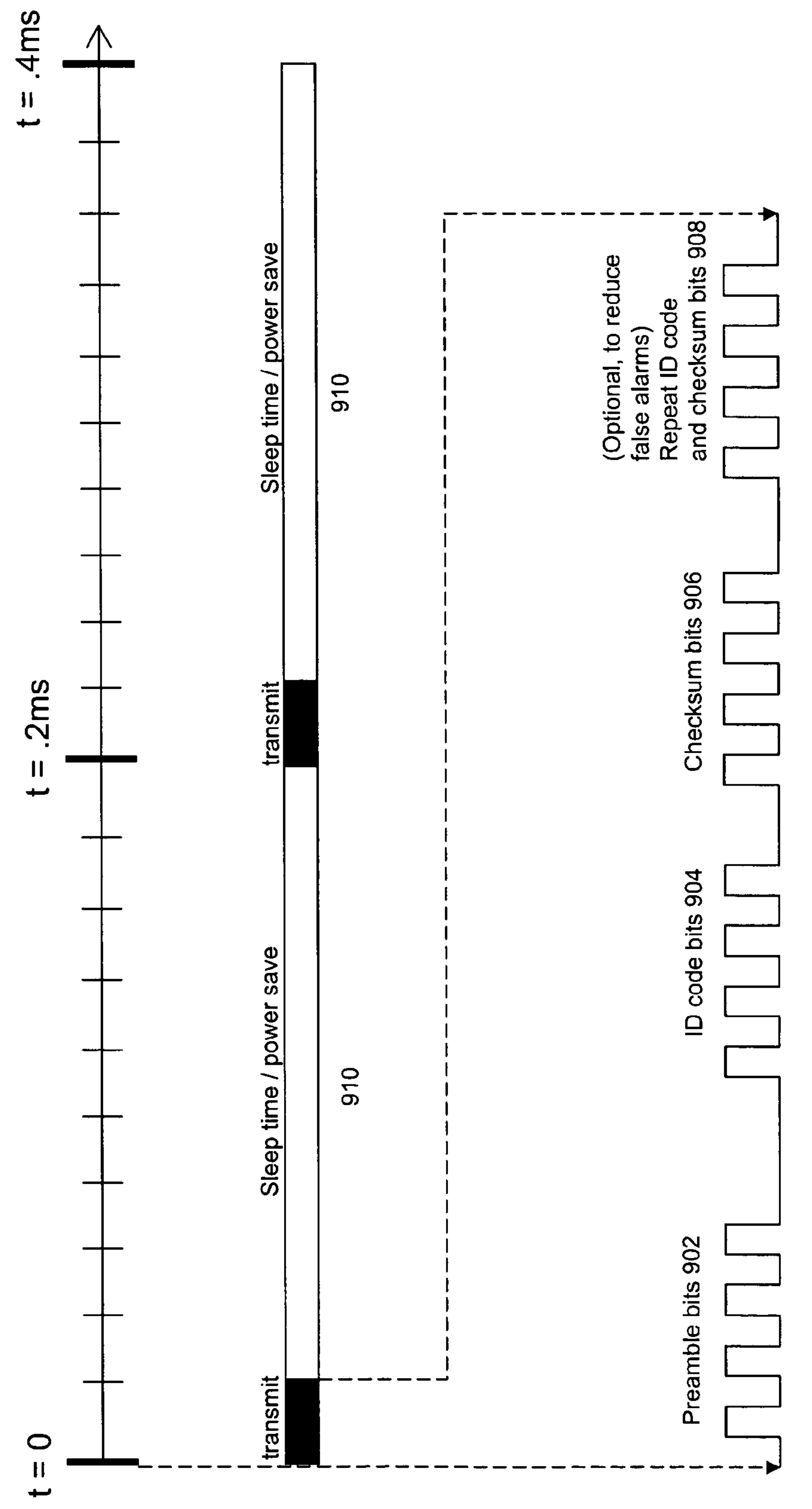
FIGS. 9*a* and 9*b* provide an illustration of messages transmitted by a transmitter according to an embodiment of the present invention.

FIG. 9*a* depicts an illustration of the identification signal transmitted by the transmitter 120, according to an embodiment of the invention. By way of example to illustrate some general principles, transmitter 120 broadcasts data that constitutes the identification signal, but may also transmit other information. The identification signal is comprised of a preamble 902, an identification code (ID code) 904 unique to each particular type of low visibility unit, a checksum 906, and periods of defined duration where no data is transmitted 910. The preamble may be necessary to allow receiver 140 sufficient time to detect the signal and transition from a low power state to an operational state where it can then receive identification messages. The portion of the identification signal that contains ID code 906 for the low visibility unit may be repeated within each broadcast (908) in order to maximize the probability that the signal is successfully decoded by receiver 140 and is able to reject erroneous signals. In order to minimize power consumption, microprocessor 310 cycles the components of transmitter 120 into a low power/sleep mode until the next scheduled transmission (upon 910 lapsing). The duration of the sleep time should be approximately 100 ms to 200 ms.

Figure 9B:
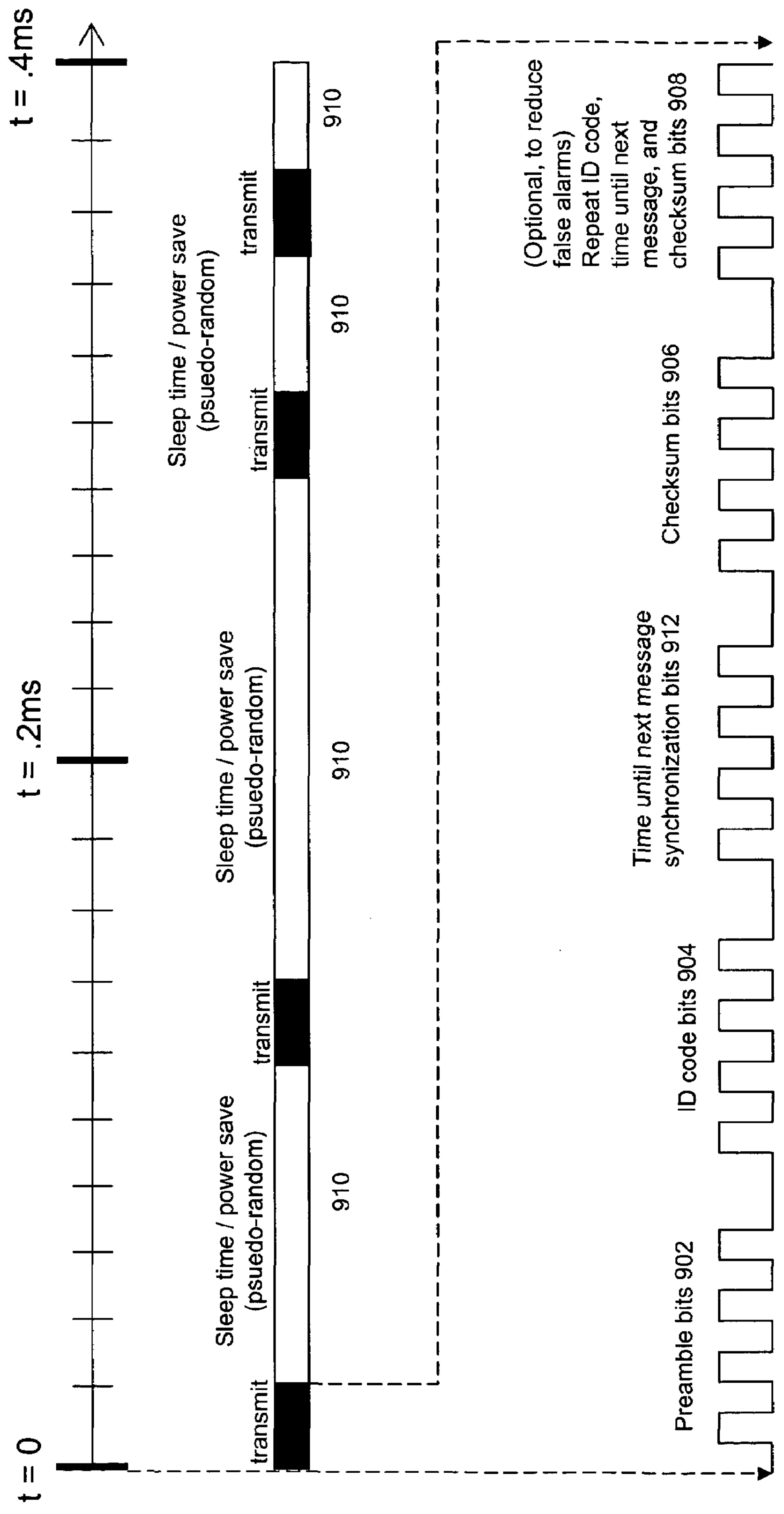

If multiple transmitter devices 120 are operated in close proximity, a scenario may arise where more than one transmitter 120 is transmitting an identification code at the same time. In this scenario, receiver 140 may not successfully identify the radio frequency signal as a known identification code. In order to avoid this problem, the duration of the time in which the transmitter device 120 remains in sleep mode (910) may be varied. This sleep duration may be varied in a predetermined pattern, or as indicated in FIG. 9*b*, may be varied randomly. The effect of such randomization is to ensure that no two transmitters 120 consistently transmit identification signals in phase and thus, increase the probability of successful detection by receiver 140. If a random timing (910) is used, then the time until the next broadcast (912) should also be encoded in the identification message. This will enable receiver 140 to know when to expect the next message and perform error rejection and power management accordingly.

An alternative method of ensuring the transmission of identification signals do not overlap or interfere is to incorporate circuitry that provides the function of the receiver 140 into transmitter 120. In this embodiment, transmitter 120 would transmit identification signals only when no external identification signals are detected by the circuitry that provides the function of receiver 140.

An alternative embodiment of receiver 140 exists that, if used in conjunction with the embodiment of transmitter 120 described above, further ensures the successful detection of the identification signal by receiver 140. In this embodiment, receiver 140 incorporates circuitry that provides the function of transmitter 120. When receiver 140 detects an identification signal, it then broadcast a "request for confirmation" message to transmitter 120. Transmitter 120, then transmit a "confirmation" message back to receiver 140. Additionally, the embodiment of transmitter 120 used in this example informs its user of a successful communication with receiver 140 via the user display 390.

Figure 10A:
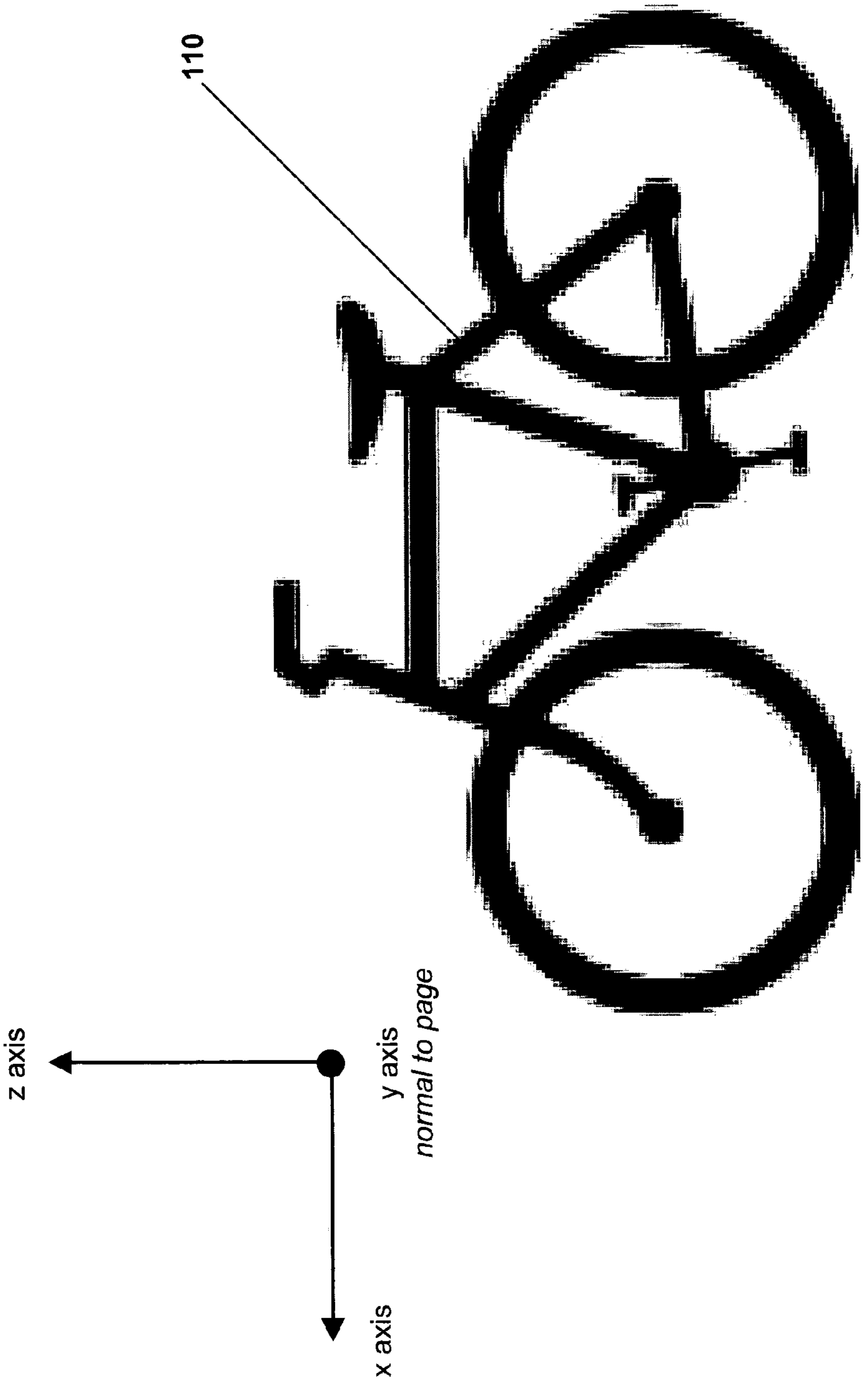
FIG. 10*a* provides a reference coordinate system for the motion detection circuits of the invention shown in FIGS. 11–13.
Figure 10B:
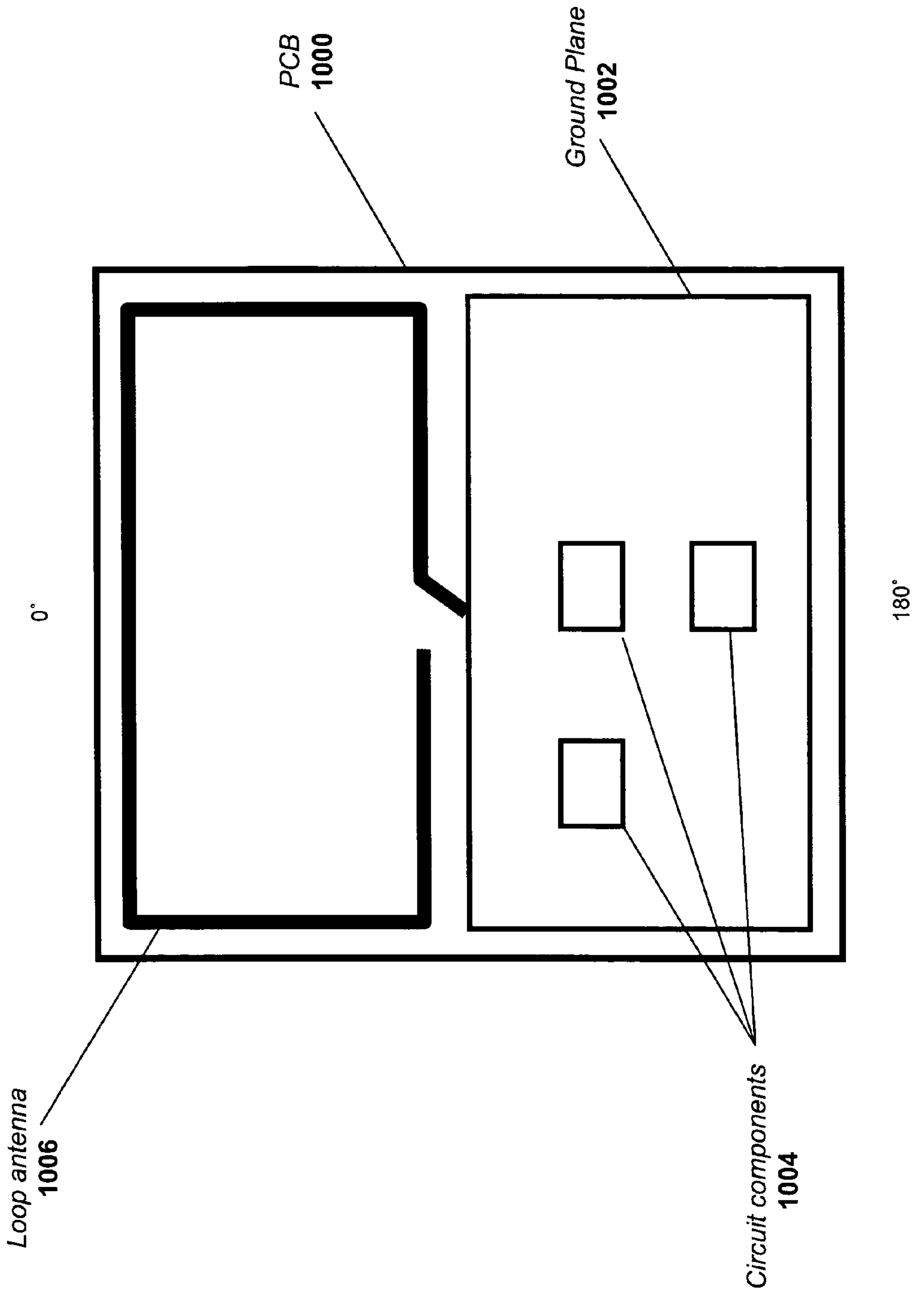
FIG. 10*b* depicts an implementation of a transmitter according to an embodiment of the present invention.
Figure 10C:
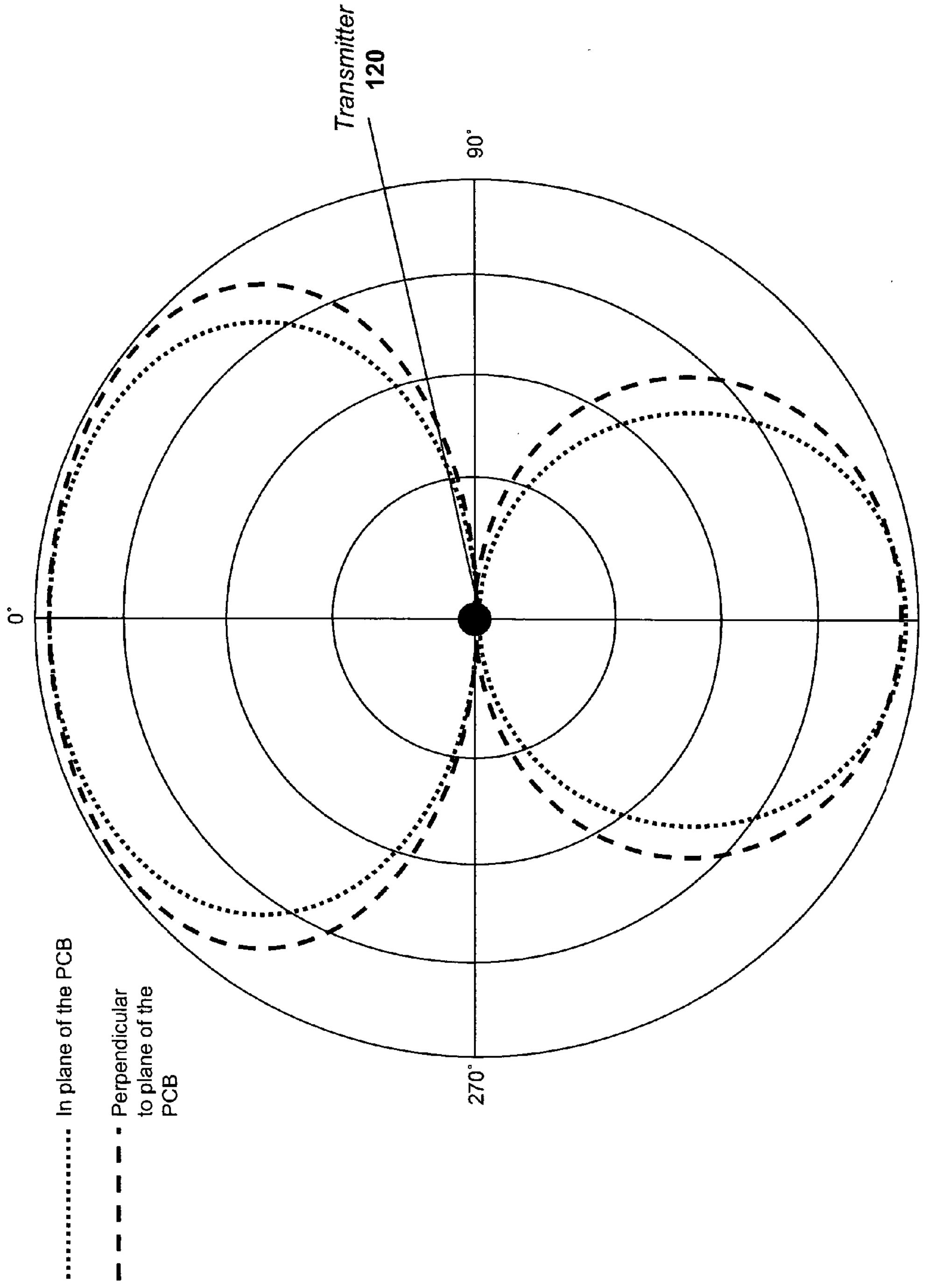
FIG. 10*c* depicts radiation patter of an implementation of a transmitter according to an embodiment of the present invention.

As discussed above, it can be useful to make use of the known radiation patterns of particular antennas. In the discussion to follow, it is necessary to refer to a reference coordinate system. Accordingly, shown in FIG. 10*a* is a reference coordinate system relative to the low visibility unit 110. As shown, the forward motion of the low visibility unit 110 is in the x axis; the upward direction is the z axis, and the direction normal to the page is the y axis. Shown in FIG. 10*b* is PCB 1000 trace loop antenna 1006 commonly used in low cost RF communication devices whose radiation pattern will be discussed. The loop trace 1006 and the ground plane 1002 together form an antenna for transmitting or receiving RF signals. FIG. 10*c* provides an example radiation pattern of a PCB 1000 trace loop antenna 1006 using a coordinate system relative to the plane of PCB 1000 which is located within the transmitter 120. While the radiation pattern can be controlled by changing the shape the PCB trace loop antenna 1006, the figure demonstrates that the performance of PCB trace loop antennas 1006 is not uniform in all directions. Although the performance of PCB trace loop antennas 1006 is not uniform, it may still be desirable to use it in transmitter 120 because it is very low cost and quite compact. If a PCB trace loop antenna 1006 is used, it is preferably oriented such that the maximum amount of radiation is in the positive x direction as defined in FIG. 10*a*. By way of example, if one were to use a PCB trace loop antenna 1006 that yielded the pattern shown in FIG. 10*c*, the plane of the PCB 1000 should be oriented in the x-z plane as defined by FIG. 10*a* and the 0° point of the antenna should be aligned with the x direction as defined by FIG. 10*a*.

Figure 11:
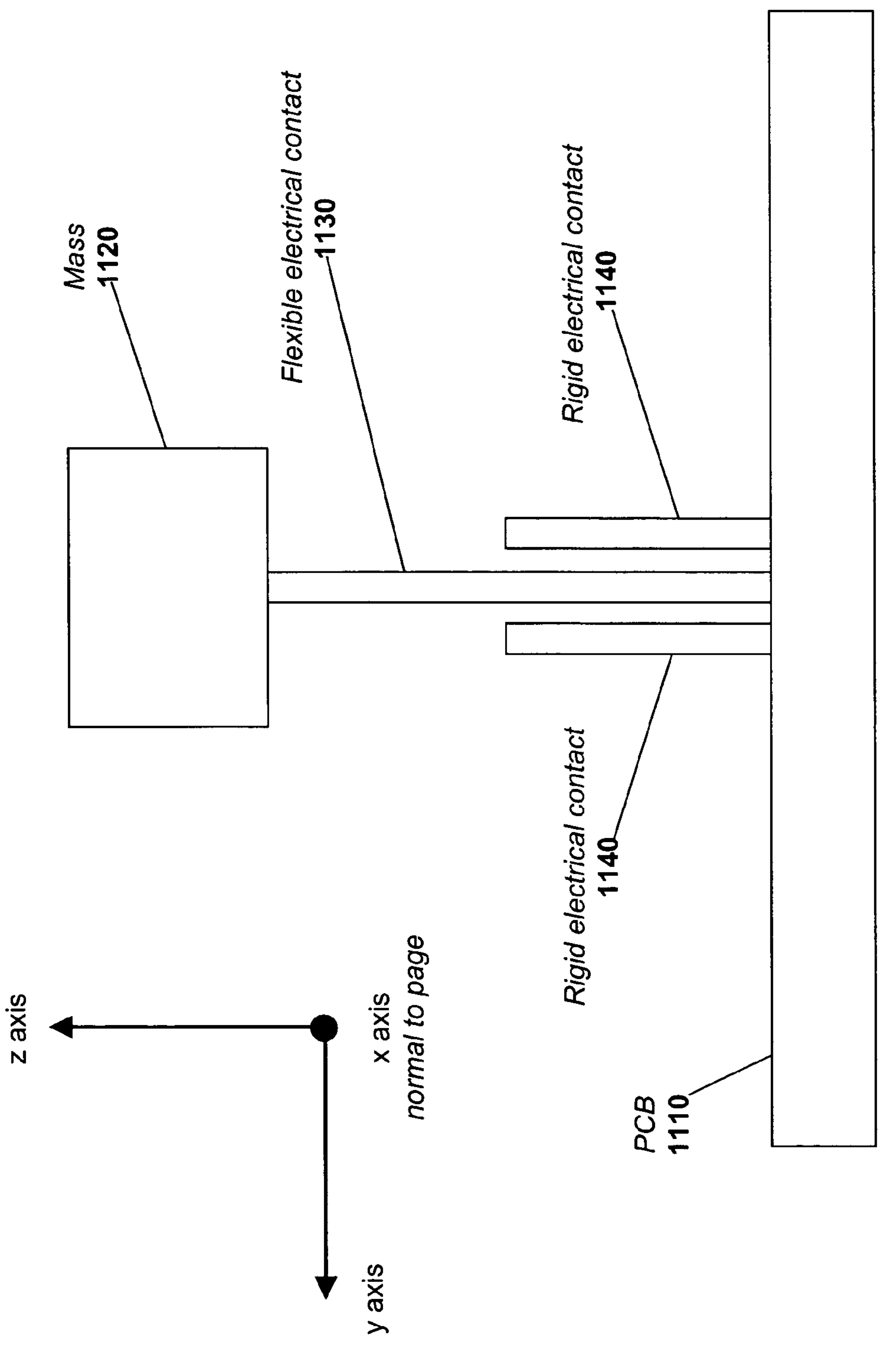
FIGS. 11–13 show alternative embodiments of a motion detection circuit according to an embodiment of the present invention.

As discussed above, the operational life of the present invention is increased through the use of motion detection circuitry 350. Shown in FIG. 11 is an illustration of inexpensive motion detection circuitry 350, according to an alternative embodiment of the invention. By way of example to illustrate some general principles, motion detection circuitry 350 comprises printed circuit board 1110 (PCB); mass 1120 which is attached to flexible electrical contact 1130 capable of flexing in the y-z plane (note coordinate system of FIG. 11); and one or more rigid electrical contacts 1140 that are attached to PCB 1110. During the normal operation of low visibility unit 110 such as a bicycle, small movements in the y axis (side to side) are common. These movements cause PCB 1110 to move relative to mass 1120. When this happens, flexible electrical contact 1130, which is rigidly attached to PCB 1110 at the end opposite the mass, periodically comes into contact with rigid electrical contacts 1140. When contact occurs, an electrical circuit is momentarily closed. The closing of this circuit is detected by microprocessor 310 and may be interpreted to represent the presence of motion. By varying the length and the degree of flexibility of flexible electrical contact 1130 and controlling the distance between flexible electrical contact 1130 and rigid electrical contacts 1140, it is possible to tune the circuit to respond to the motions typically experienced by the low visibility unit 110 in a repeatable manner.

Figure 12:
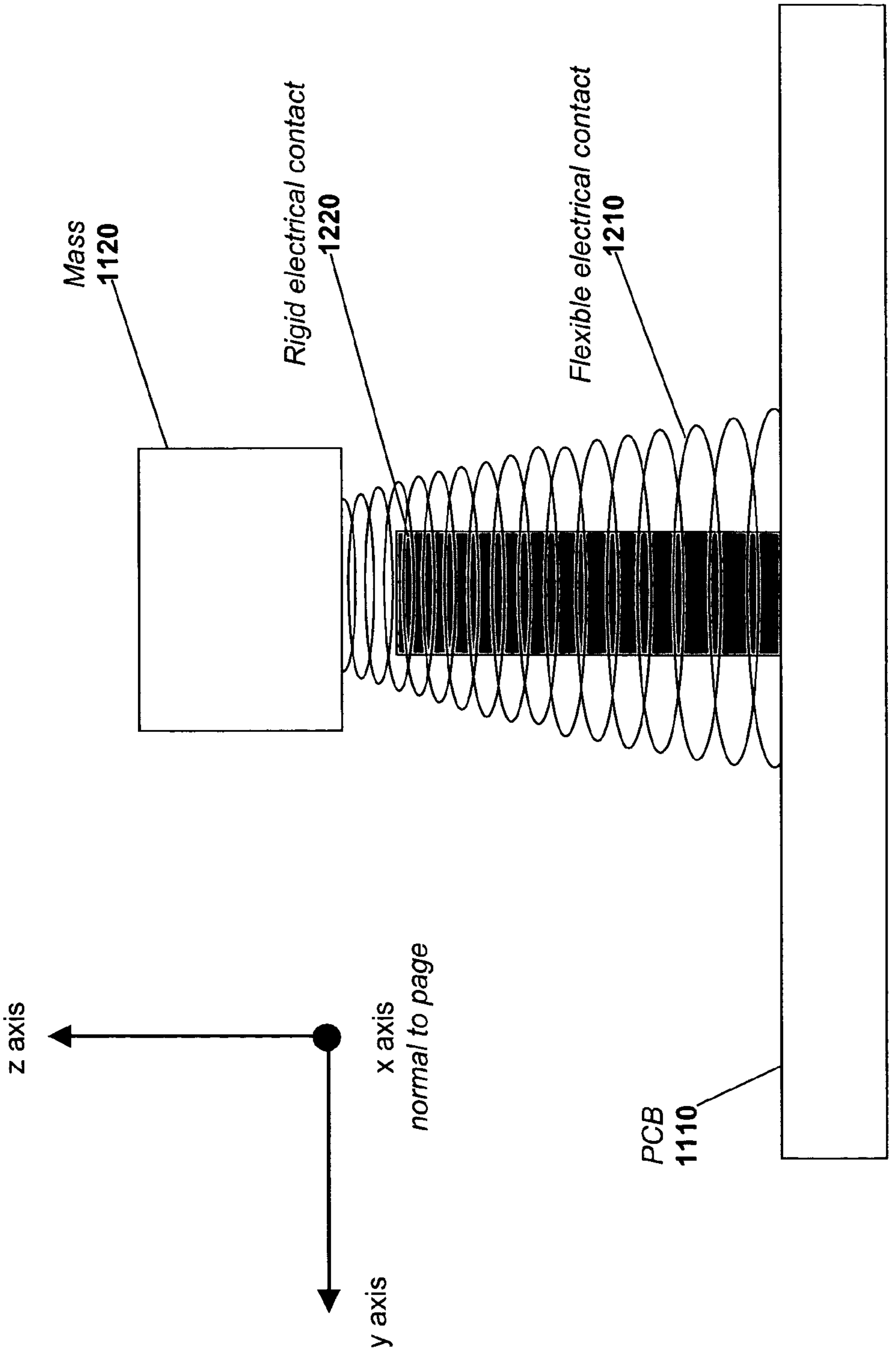

FIG. 12 depicts an illustration of another motion detection circuitry 350, according to an alternate embodiment of the invention. By way of example to illustrate some general principles, motion detection circuitry 350 comprises printed circuit board 1110 (PCB); mass 1120 which is attached to flexible electrical contact 1210; and rigid electrical contact 1220 that is attached to PCB 1110. This embodiment operates in a similar manner as the embodiment illustrated in FIG. 11, but in this embodiment, flexible electrical contact 1210, which is rigidly attached to PCB 1110 at the end opposite the mass, is capable of flexing in both the y-z and x-z planes. More particularly, the electrical circuit is closed when the flexible electrical contact 1210 comes into contact with the rigid electrical contact 1220.

Figure 13:
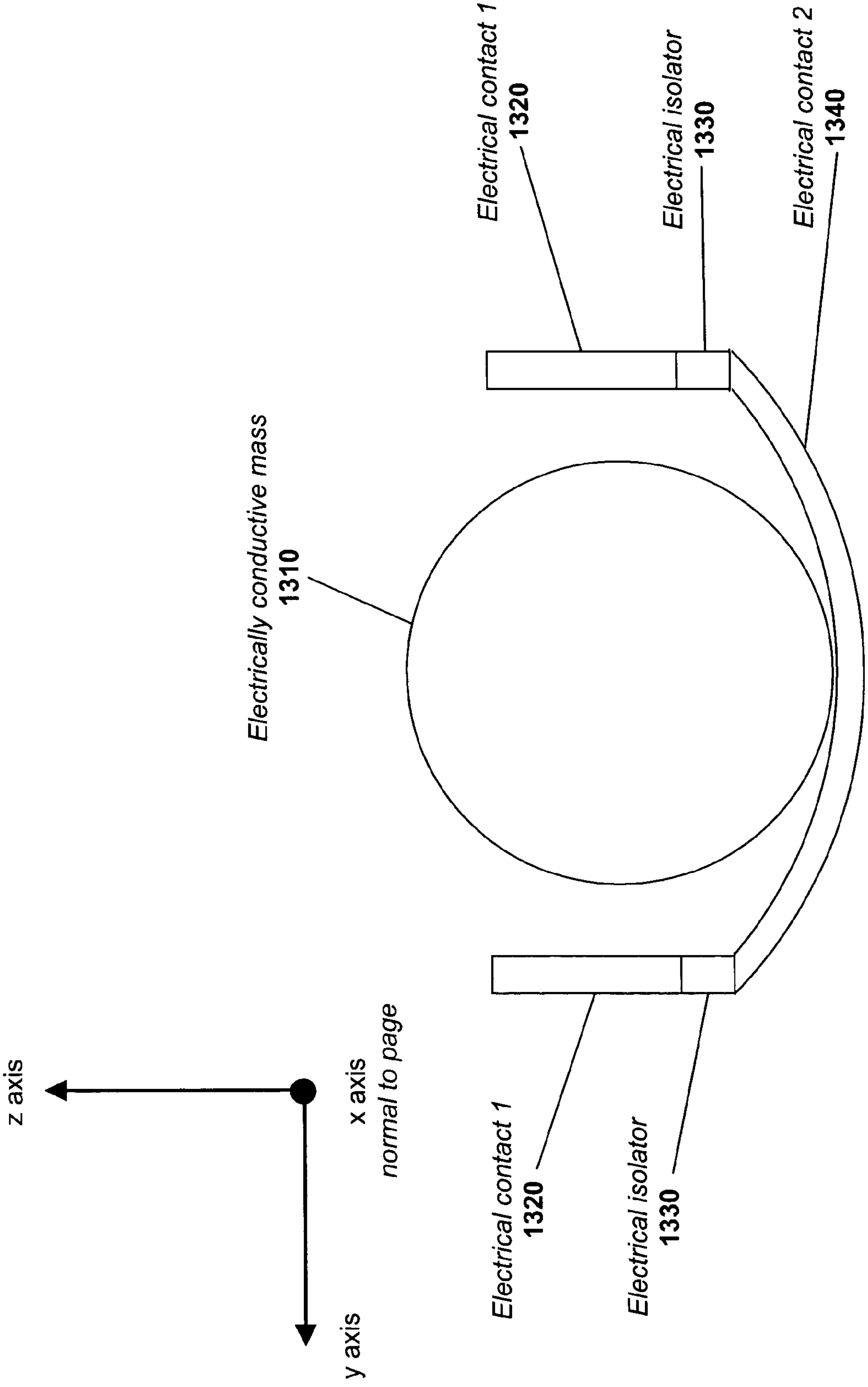

FIG. 13 depicts an illustration of inexpensive motion detection circuitry 350, according to an alternate embodiment of the invention. By way of example to illustrate some general principles, motion detection circuitry 350 comprises electrically conductive mass 1310 with a shape that permits rolling; one or more electrical contacts 1320 that together constitute one side of an electrical switch; one or more electrical isolators 1330; and electrical contact 1340 that constitutes the opposite side of the electrical switch established by electrical contacts 1320. This embodiment operates in a similar manner as the embodiment illustrated in FIG. 11, but in this embodiment, the motion of low visibility unit 110 causes the mass 1310 to roll onto electrical contact 1340. The electrical circuit is closed when mass 1310 comes into contact with the electrical contact 1320.

Additional methods of implementing motion detection circuitry 350 are possible, but not included in the drawings. These include implementation of: an accelerometer that is sensitive to movement in on or more of the x, y, or z axes; a Hall effect sensor mounted to the low visibility unit 110 which is sensitive to a magnet which is mounted to one of the spokes of a wheel of the low visibility unit 110; and a photo-diode or photo-transistor that is sensitive to the variations in light that occur when a bicycle moves past objects. Still other implementations are possible without deviating from the teachings of the present invention as known to those of skill in the art.

Figure 14:
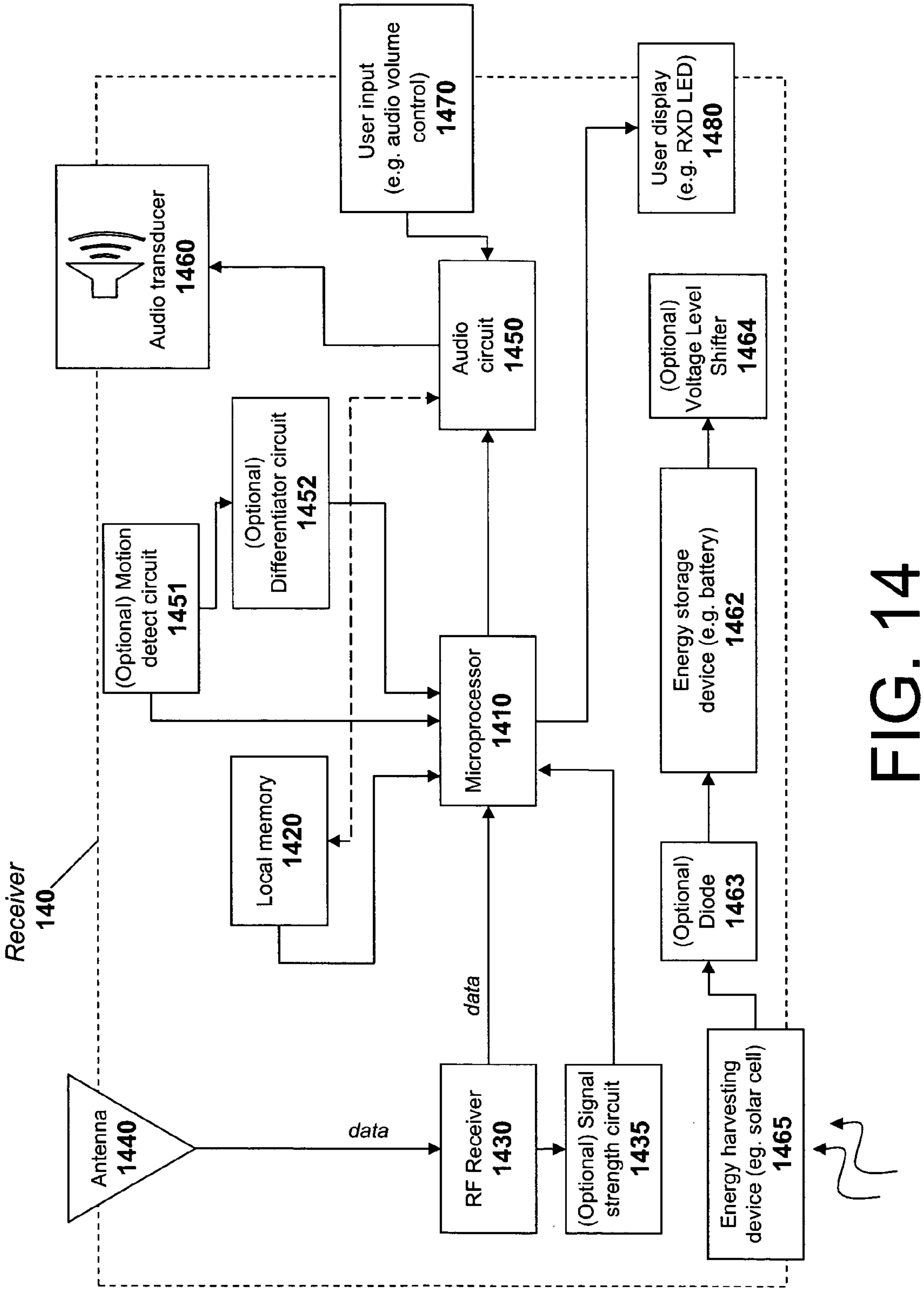
FIG. 14 is a block diagram of a receiver according to an embodiment of the present invention.

FIG. 14 depicts a schematic illustration of receiver 140, according to an embodiment of the invention. By way of example to illustrate some general principles and architecture of the invention, receiver 140, which may be located in the passenger compartment of automobile 130, comprises local microprocessor 1410 which may execute instructions that reside in local memory 1420; RF receiver circuitry 1430 capable of receiving radio frequency waves of a given frequency from antenna 1440 designed for the optimal reception of radio frequency waves at a predetermined frequency; signal strength circuitry 1435 capable of measuring the strength of an RF signal; audio circuitry 1450 capable of producing alert signals to be broadcast by an audio transducer 1460; energy storage device 1462 such as a battery capable of supplying power to the components of the receiver device 140; energy harvesting device 1465 such as a photovoltaic cell, capable of charging energy storage device 1462 when in the presence of light energy; user input 1470 such as a control knob, which may be used by the operator to control the volume of the audible alert; and user display 1480, such as one or more light emitting diodes, for the purpose of further informing the user of the operation status and or battery charge level of the receiver device 140 and the presence of low visibility mobile road hazards.

In one embodiment, microprocessor 1410 executes instructions in the form of a program which resides in local memory 1420. This local memory 1420 may be a separate component or may be integrated directly into microprocessor 1410. Microprocessor 1410 operates in a low power state while monitoring RF receiver circuitry 1430 for an indication of the presence of radio frequency waves of the same frequency as those broadcast by transmitter 120. When such radio frequency waves are detected, microprocessor 1410 causes the remaining components of the receiver 140 to transition into a fully powered state while it attempts to decode the signals received via RF receiver circuitry 1430. Microprocessor 1410 compares the decoded message to a plurality of identification codes stored in local memory 1420. These codes, or ID signals, correspond to the various types of low visibility mobile road hazards. If the received message is determined to match any of the known ID codes, microprocessor 1410 sends signals to audio circuitry 1450 to deliver a specific audible alert that corresponds to the type of low visibility mobile road hazard that has been detected. The audible alert may be in the form of a message or series of messages prerecorded in local memory 1420 or it may be generated directly by audio circuitry 1450. Audio circuitry 1450 sends signals to audio transducer 1460 in order to present audible alert messages to the user. The user is provided with user input 1470, which may be used to adjust the volume of such audible alert messages.

It should be noted that electronic components that incorporate the function of both microprocessor 1410 and RF receiver circuitry 1430 are becoming more readily available in the market place. The function described above can be implemented in such components without changing the nature of the invention. It should also be noted that electronic components that incorporate a combination of the functions of microprocessor 1410, local memory 1420, and audio circuitry 1450 are becoming more readily available in the market place. Accordingly, the function described above can be implemented in such components without changing the nature of the invention.

In one embodiment, receiver 140 includes signal strength circuitry 1435 capable of measuring the strength of an RF signal. In this embodiment, microprocessor 1410 receives the signal from signal strength circuitry 1435 and displays a representation of the signal strength. This display may be in the form of audible alerts varied in time and/or intensity in order to represent the signal strength. Such audible alert signals are sent from microprocessor 1410 to audio circuitry 1450. Additionally, the display may also be in the form of a visual indication on user display 1480.

In one embodiment, receiver 140 is powered by energy storage device 1462. Energy storage device 1462 is charged by energy harvesting device 1465 such as a photovoltaic cell. If a photovoltaic cell is used, diode 1463 is preferably placed between energy storage device 1462 and energy harvesting device 1465 in order to ensure that current from the energy storage device 1462 does not flow backward through the energy harvesting device 1465 when the receiver device 140 is in an environment without light. Additionally, it may be necessary to use voltage level shifter 1464, commonly a charge pump or voltage regulator, in order to meet the operational voltage needs of the circuitry incorporated into receiver 140. For example, voltage level shifter 1464 may be needed because small form factors may render it impractical to use a photovoltaic cell that produces sufficient voltage to operate the components of the circuit or to recharge the batteries. The voltage level shifting discussed with reference to transmitter 120 is similarly applicable to receiver 140 discussed here.

An alternative embodiment exists where energy harvesting device 1465 is not incorporated into receiver 140, but energy storage device 1462 may need to be periodically replaced by the user. An alternative embodiment exists where energy storage device 1462 is not incorporated into receiver 140, but power is delivered to receiver 140 via a connection to an external power source such as an automobile battery through a power port. In such an embodiment, voltage level shifter 1464, such as a voltage regulator, may need to be incorporated into the receiver 140 in order to meet the operational voltage needs of the circuitry incorporated into receiver 140.

An alternative embodiment of receiver 140 exists where motion detection circuitry 1451 which generates a signal in response to movement in a given direction is incorporated into receiver 140. If an accelerometer is used, its output should be fed through differentiator circuit 1452. In such an embodiment, the components of receiver 140 operate in a low power state until a signal from differentiator circuit 1452 causes a microprocessor pin to transition logic levels. Once this occurs, microprocessor 1410 activates the components of the receiver and begins the process of listening for identification signals, decoding messages, and producing alerts as described above, until no further signal is generated by motion detection circuitry 1451. At such time, microprocessor 1410 will continue the process of monitoring for identification signals for some period of time as determined by the instructions which reside in local memory 1420. This period of time should be sufficiently long so as to continue to monitor for identification signals during situations where no movement is present, but the detection of low visibility mobile road hazards would still be desirable to the operator of automobile 130. An example timeout period would be 2 to 3 minutes. An example of such a situation is stopping automobile 130 at a traffic signal.

An alternative embodiment of the receiver device 140 exists where the function is incorporated directly into the automobile 130. An alternative embodiment of receiver 140 exists in the form of receiver 150. This embodiment, illustrated in FIG. 1, is specialized to the application of roadway sign 160. In such an embodiment, the antenna in receiver 150 is shaped (or the gain could be controlled) so as to be sensitive only to signals broadcast from a particular direction. This allows roadway sign 160 to provide alerts corresponding only to low visibility units 110 or other low visibility mobile road hazards traveling in a particular direction or particular lane of the roadway.

There are a number of other applications where receiver 140 illustrated in FIG. 14 may be specialized. For example, it may be desirable for the operator of low visibility unit 110 to detect the presence of other low visibility units (e.g., bicycles) or automobiles 130 that are equipped with transmitter 120 similar to that described in FIG. 5. Furthermore, it may be desirable to incorporate the functionality of transmitter 120 and receiver 140 into a single device in order to enable bi-directional detection and/or communication. These applications include, but are not limited to; bicycles, joggers, pedestrians, equestrians, hikers, roller skates, motorcycles, automobiles, animal drawn carts and scooters.

Figure 15A:
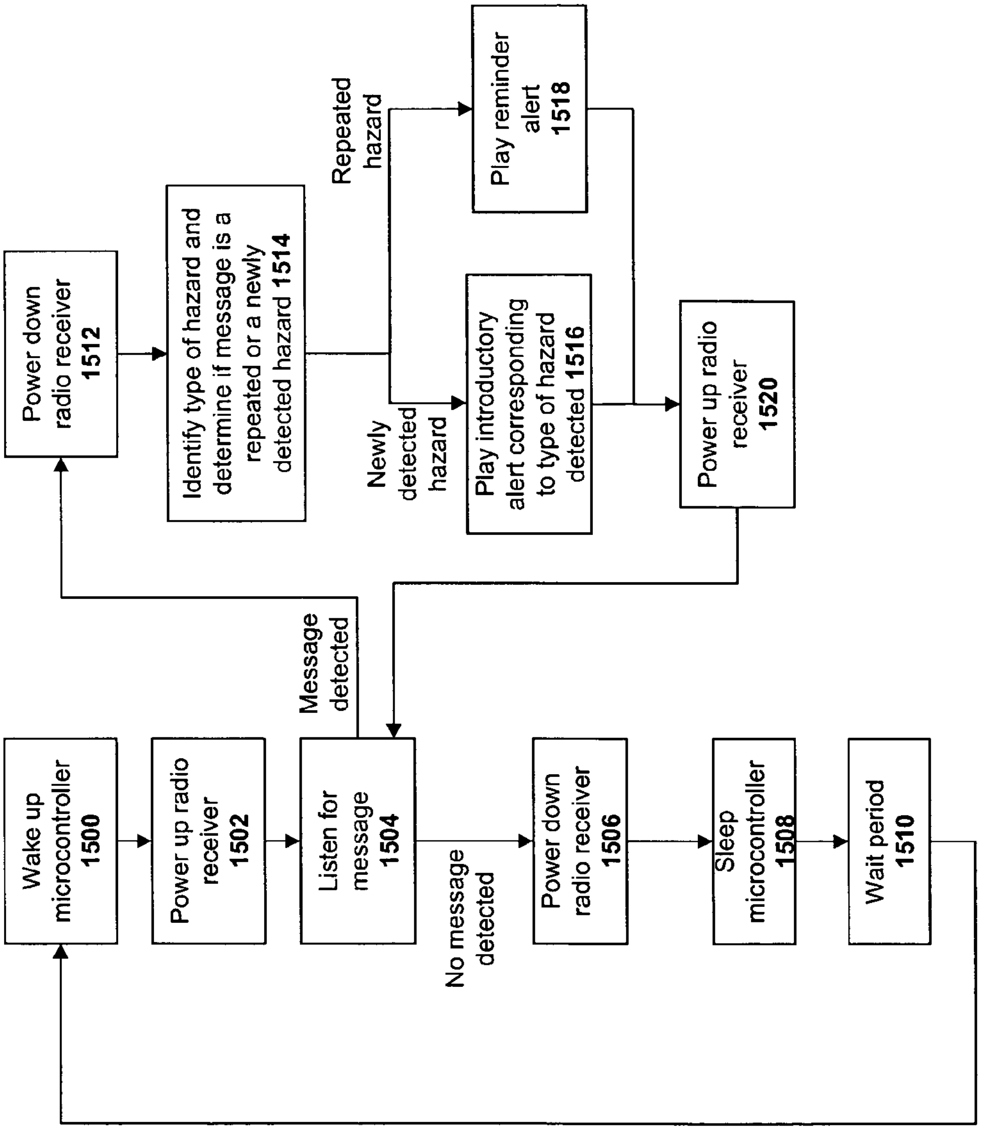
FIGS. 15*a* and *b* are flow blocks depicting alternative operation of a receiver according to an embodiment of the present invention.

FIG. 15*a* depicts an illustration of a method implemented by receiver 140, according to an embodiment of the invention. By way of example to illustrate some general principles and architecture of the invention, the microcontroller is powered up at regular intervals (1500). The microcontroller then commands the RF receiver circuit to power up (1502) and listen for identification messages (1504) for a period of time. If no valid message is detected, then the microcontroller powers down the RF receiver circuit (1506) and then puts itself into a low power sleep mode (1508) for some period of time (1510). This period of time is the wait period. Once the wait period has elapsed, the microcontroller is again powered up (1500) and the cycle repeats.

If however, a valid message is detected (1504), then the microcontroller powers down the RF receiver circuitry in order to conserve power (1512). The microcontroller identifies the type of hazard according to the ID code embedded in the message (1514) and determines if this hazard is a newly detected hazard or the same hazard that was detected the previous time through the local execution loop. If it is a new hazard, then an introductory audible alert is played (1516) to announce the presence of the hazard. If the hazard has already been announced, then a reminder alert, such as a short tone is played (1518). After the introductory or reminder alerts are played, the microcontroller again turns on the RF receiver circuitry (1520) and listens for more messages (1504).

Figure 15B:
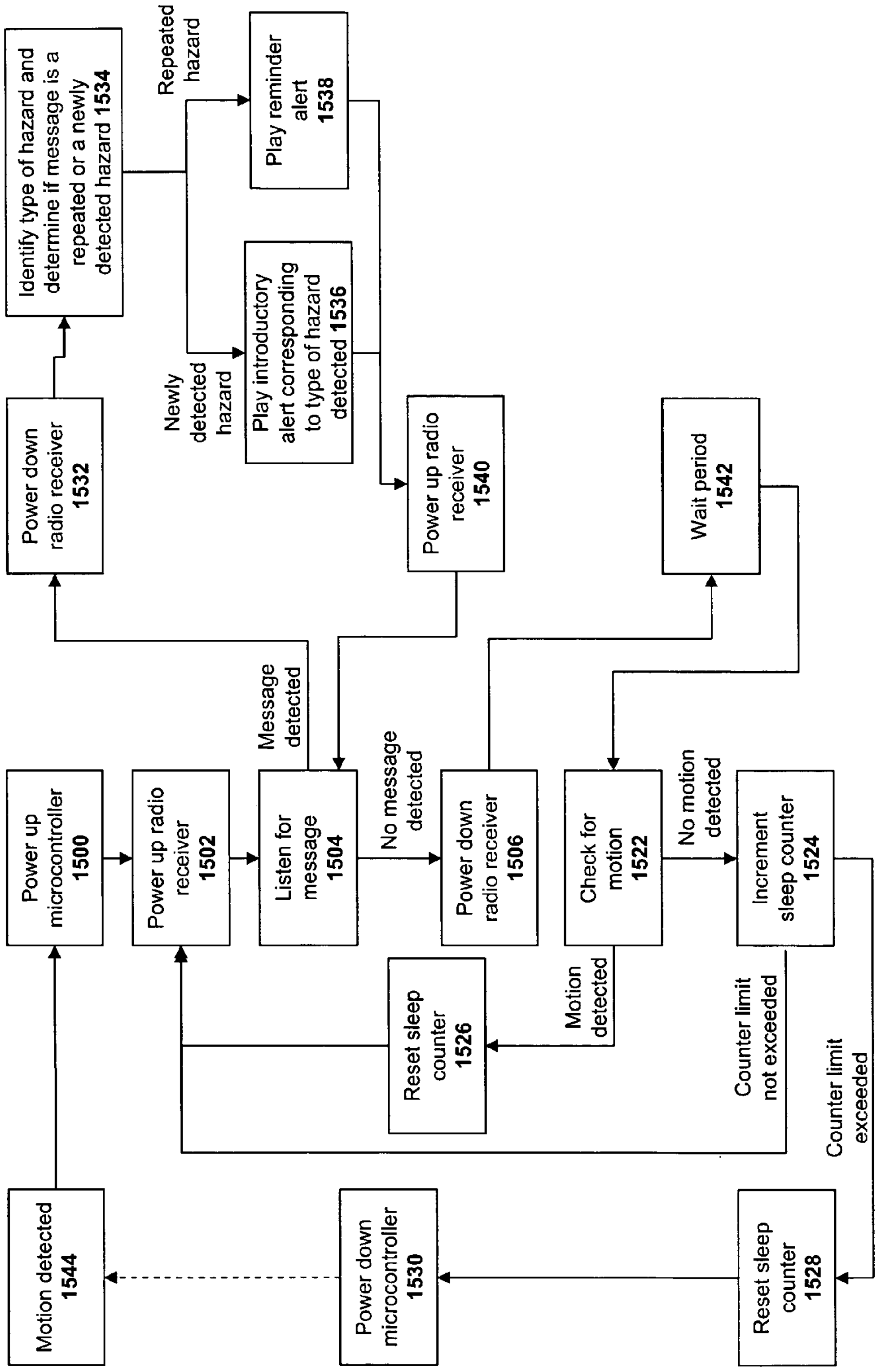

FIG. 15*b* depicts an illustration of an alternative method implemented by receiver 140, according to an embodiment of the invention. By way of example to illustrate some general principles and architecture of the invention, this method is similar to that described in FIG. 15*a*. The primary difference in this method is that power is managed according to input from a motion detection circuit (1544). In this method, the microcontroller remains in a low power state until motion is detected. After motion has ceased (1522), the microcontroller continues to execute the signal reception loop for some defined period of time before returning to a low power sleep state(1524, 1528, 1530). This method enables receiver 140 to use less energy, extending the battery life or reducing the need to recharge the batteries.

In certain implementations, it is sometimes desirable to vary the responsiveness of the present invention. FIG. 16*a* depicts an illustration of a responsiveness scheme implemented by receiver 140, according to an embodiment of the invention. By way of example to illustrate some general principles and architecture of the invention, this scheme is responsive to the signals received by receiver 140. The highest level (Level 1) of responsiveness is to initiate the playing of an alert immediately upon receiving a signal, before checking for a valid message structure. While the alert is being initiated, receiver 140 receives the remaining message, decodes it and matches the ID code to the know hazard codes. If no match is detected, then the audible alert is canceled. If a match is detected, then the audible alert is updated to indicate the nature of the hazard. The next highest level of responsiveness (Level 2) is to wait to initiate an audible alert until a message is successfully decoded and determined to match a known ID code. This level increases the amount of time from signal reception to audible alert, however, it reduces the likelihood of false alerts. The third level of responsiveness (Level 3) further reduces the likelihood of false alerts at the expense of response time. In this level, 2 successive messages must be decoded and determined to match a known ID code in order for an audible alert to be initiated.

Figure 16B:
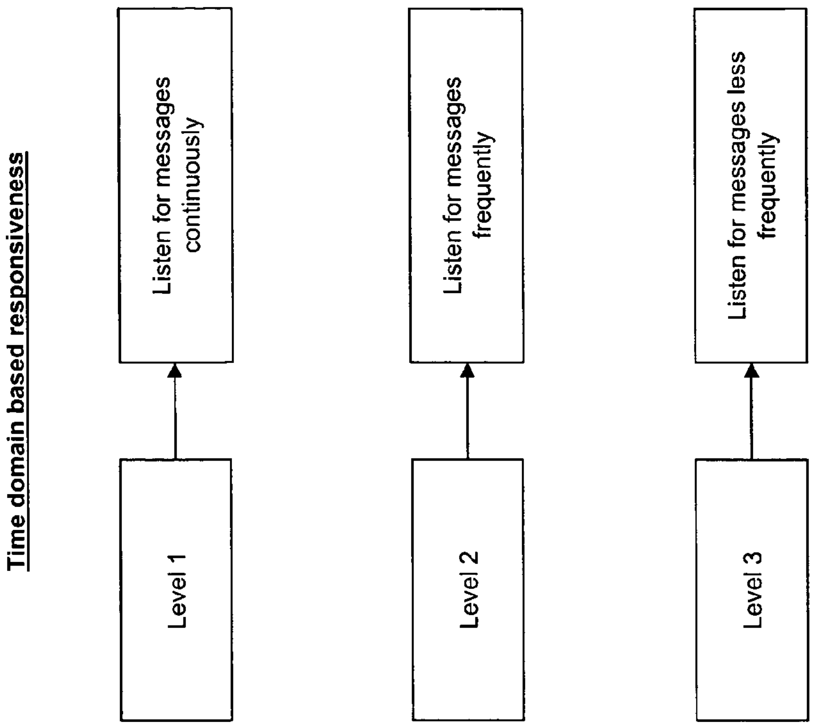
FIG. 16*b* is an illustration of a time based responsiveness of a receiver according to an embodiment of the present invention.
Figure 16A:
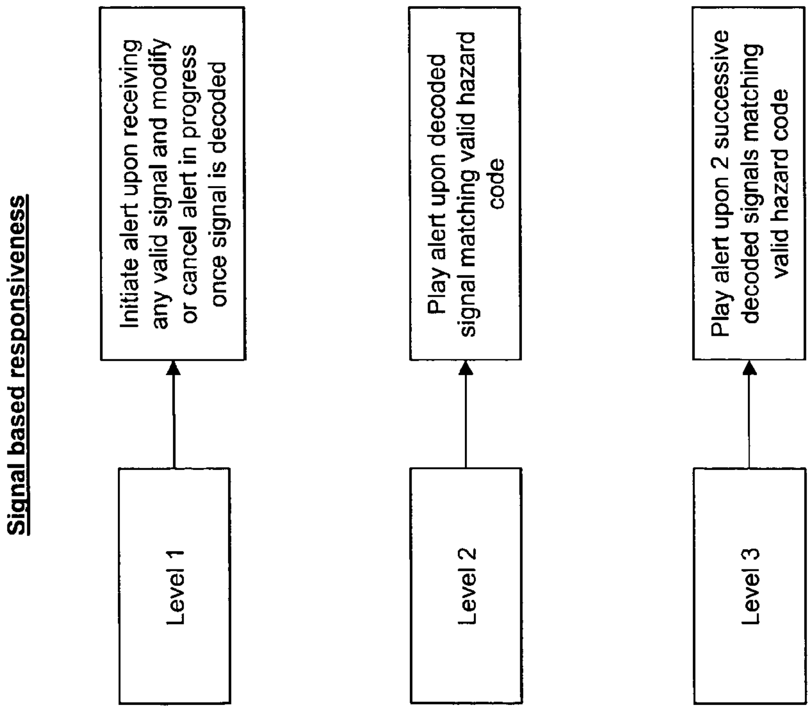
FIG. 16*a* is an illustration of a signal based responsiveness of a receiver according to an embodiment of the present invention.

FIG. 16*b* depicts an illustration of a responsiveness scheme implemented by receiver 140, according to another embodiment of the invention. By way of example to illustrate some general principles and architecture of the invention, this scheme is time based. The highest level of responsiveness (Level 1) is to continuously listen for signals. This level affords fast response time at the expense of power consumption. The next highest level of time based responsiveness (Level 2) is to listen for messages frequently, while having short periods of low power consumption. The lowest level of time based responsiveness (Level 3) is to conserve more energy and listen less frequently.

FIG. 17 shows how the signal based and time based responsiveness schemes can be combined to produce several levels of overall responsiveness. The highest level of responsiveness, for example, would be to listen for signals continuously and initiate and audible alert as soon as a signal is detected. These various levels of responsiveness can be selected by the user of the receiver device 140 or could be automatically selected by the microcontroller in response to input from sensors.

Figure 18:
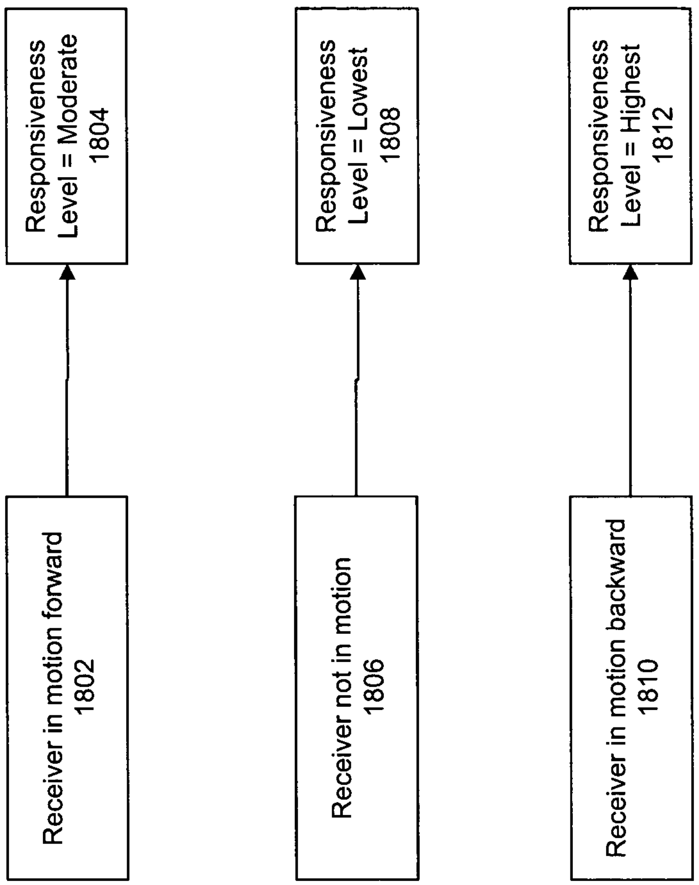
FIG. 18 is an illustration of a motion based responsiveness of a receiver according to an embodiment of the present invention.

FIG. 18 shows how responsiveness levels are selected according to input from the motion detection circuit. If the automobile containing receiver 140 is moving forward, a moderate level of responsiveness with a good level of false alert rejection is desirable (1804). If the automobile is not moving, the reception of alerts is not as time critical and a lower level of responsiveness that provides even greater false alert rejection and power conservation may be implemented (1808). If the automobile is traveling in reverse, however, a high level of responsiveness may be desired (1812). This is because it may be extremely difficult to see objects while traveling in reverse. Parents, as a population, for example, are extremely sensitive to the need to be aware of children when backing up out of driveways. In this example, parents may tolerate a lower level of false alert rejection in order to ensure the safety of their own children. The ability to detect hazards while traveling in reverse is known as "back up mode" and may indeed offer such a significant perceived benefit to automobile users, especially parents, that the adoption problem of two-part transmitter-receiver systems may be overcome.

Figure 19:
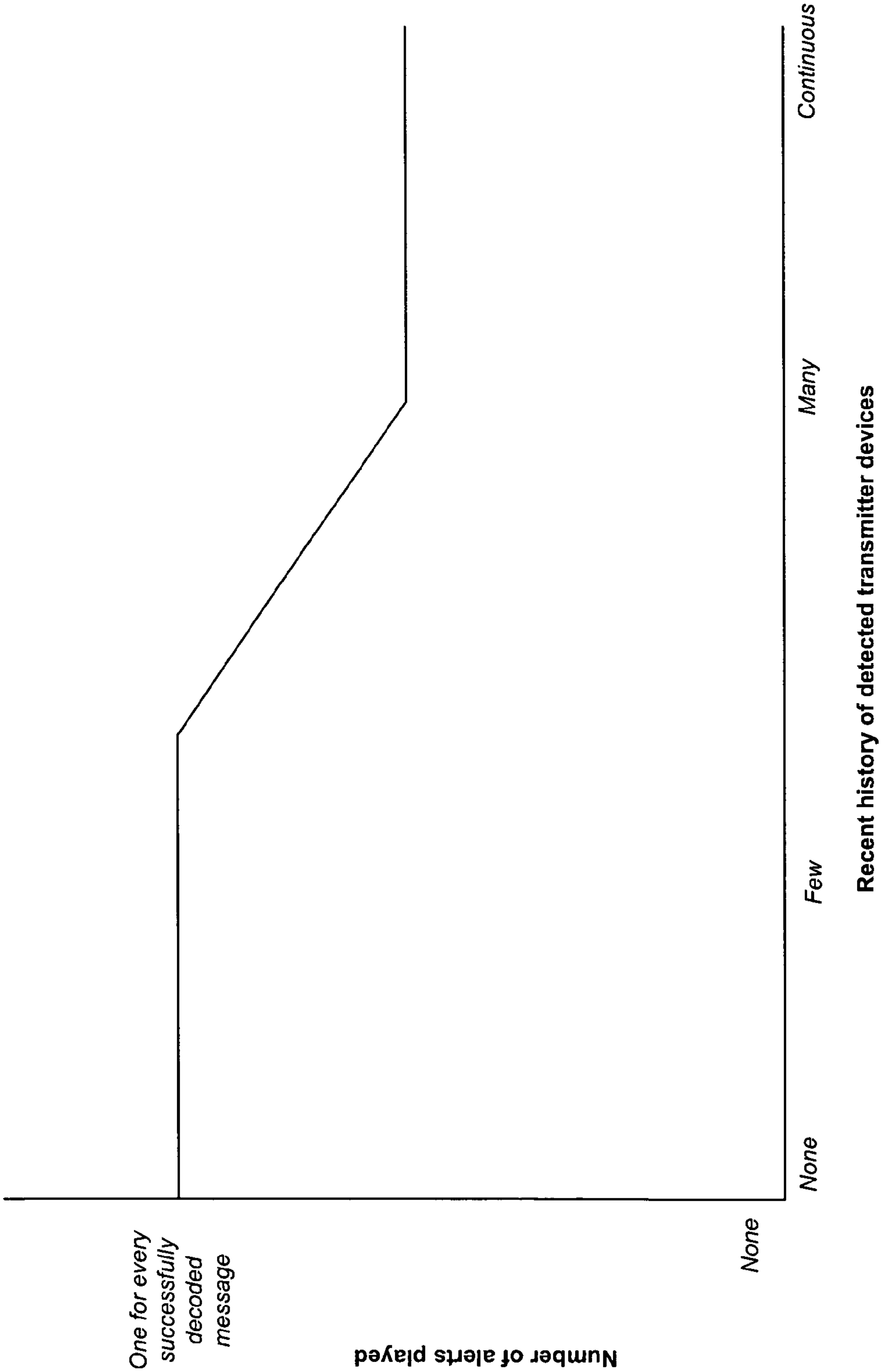
FIG. 19 is an illustration of a historically based responsiveness of a receiver according to an embodiment of the present invention.

In densely populated areas such as inner cities, many transmitters 120 may be present in a small geographic area. As such, a situation may arise where the increased number of audible alerts that are produced by receiver 140 loses its perceived importance or becomes distracting. FIG. 19 shows a manner of addressing this problem. By adjusting the frequency of the audible alerts according to the number of transmitter devices detected in the recent past, the audible alerts can maintain the appropriate level of warning without becoming a distraction or annoyance. When few transmitters 120 are present, each transmitter warrants the alert to a hazard. This is because users receiver 140 may not be expecting hazards when few or no hazards are present and will benefit from many warnings. As the number of transmitters present increases, the user of receiver 140 may become conditioned to expect hazards and therefore needs fewer alerts. When this occurs, the number of alerts is adjusted downward. This can be done by simply playing every $n^{th}$ audible alert that is called for by the alert algorithm, where n is inversely proportional to the number of transmitter devices 120 detected in the recent past. The duration of the "recent past" should be long enough so that the driver is not annoyed by too many alerts yet is given sufficient alerts when they travel to an area where fewer transmitter devices are present. An example would be driving from the city to a suburb. Therefore, the recent past should be on the order of 2 to 5 minutes. There should also be an upper limit on n such that even in a crowded environment, sufficient alerts are played to provide the user of receiver 140 with periodic reminders of alerts.

Figure 20A:
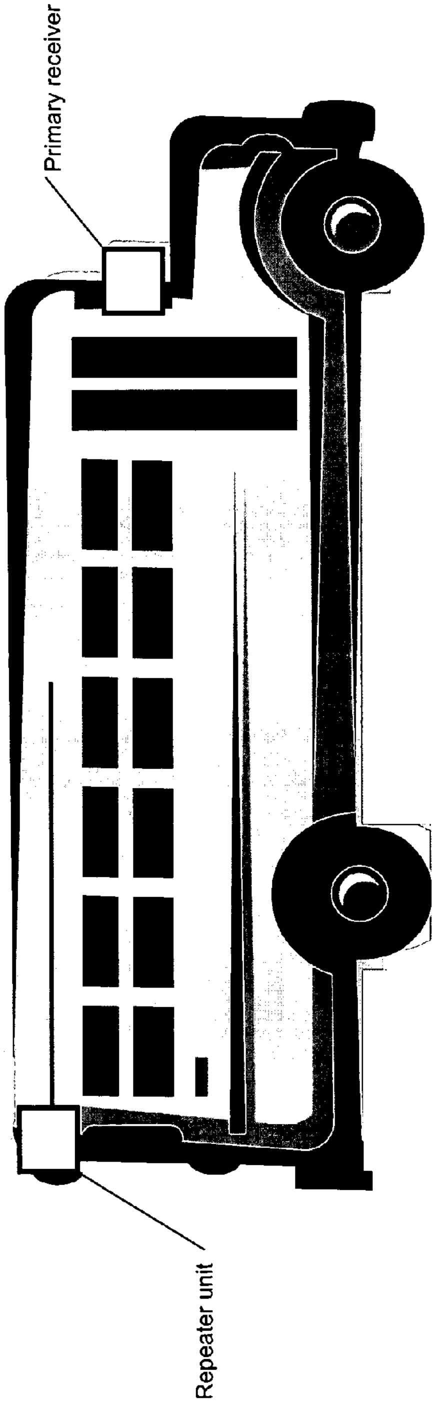
FIG. 20 is an illustration of alternative placement of a receiver according to an embodiment of the present invention.

Implementation of receiver 140 can be changed to meet particularized issues. For example, FIG. 20*a* shows an alternative embodiment of a presence detection receiver device according to the invention. This embodiment enables large vehicles that may obstruct signals coming from their sides or rear to receive messages from transmitter 120. Busses and delivery vehicles commonly have more accidents with low visibility mobile road hazards because of the limited visibility afforded to the driver and the fact that they frequently pull in and out of traffic. By placing a repeater unit in the rear of the vehicle, a signal that is too weak to be detected by the primary receiver may be received by the repeater, then passed on in an amplified manner to the primary receiver for decoding and alerting the driver of the vehicle.

Figure 20B:
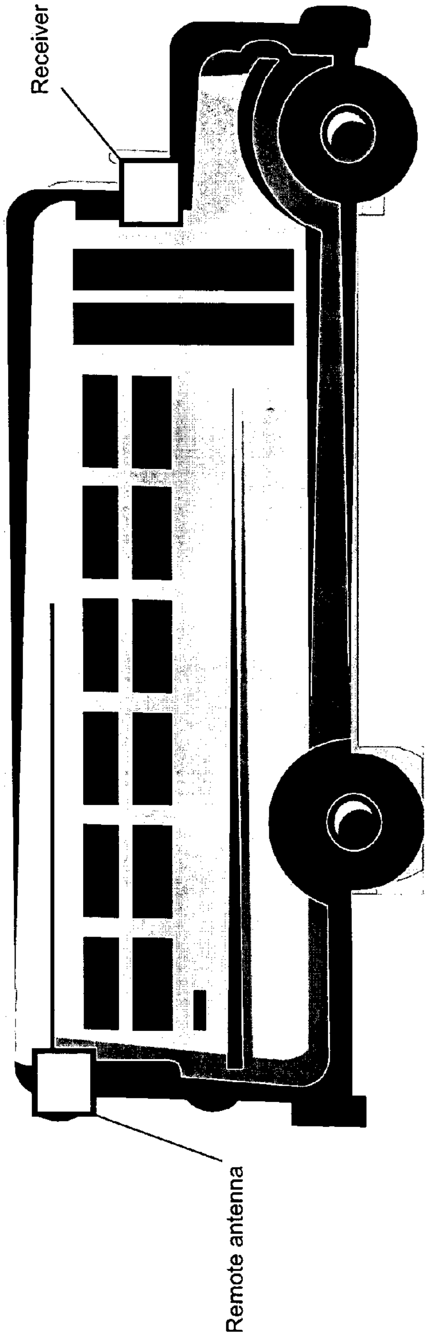

FIG. 20*b* shows an alternative embodiment of a presence detection receiver device according to the invention. This embodiment enables large vehicles that may obstruct signals coming from their sides or rear to receive messages from transmitters 120. By placing a remote antenna in the rear of the vehicle, a signal may be received by receiver 140. Receiver 140 may alternate between receiving via the built in antenna and the remote antenna.

The preferred embodiment of the present invention is thus described. While the present invention has been described in particular embodiments, it should be appreciated that the present invention should not be construed as limited by such embodiments, but rather construed according to the below claims.

What is claimed is:

1. An system, comprising:

a transmitting unit that includes a motion detection circuit, a microprocessor, and a radio frequency modulator, wherein the motion detection circuit is configured to direct a motion detected signal to the microprocessor upon the apparatus being moved in a predetermined manner, the microprocessor is configured to generate an encoded message that includes an identification code denoting a type of transmitter, and the radio frequency modulator is configured to modulate the encoded message at a transmitting frequency; and a receiving unit that includes a radio frequency receiver, a microprocessor, and an output, wherein the radio frequency receiver receives the encoded message at the transmitted frequency, the microprocessor is configured to determine the identification code, and the output is configured to alert a user of the presence of the transmitting unit.

2. The system of claim 1, wherein the transmitting unit further includes a source of electrical power that includes a battery coupled to the transmitting unit.

3. The system of claim 1, wherein the transmitting unit further includes a source of electrical power that includes an energy harvesting device.

4. The system of claim 3, wherein the energy harvesting device is an electro-mechanical generator.

5. The system of claim 3, wherein the energy harvesting device includes a photo-voltaic cell.

6. The system of claim 1, wherein the transmitting unit further includes a mechanical fastener.

7. The system of claim 6, wherein the mechanical fastener affixes the transmitter unit to a bicycle.

8. The system of claim 6, wherein the mechanical fastener affixes the transmitter unit to a person.

9. A transmitting unit, comprising:

a motion detection circuit;

a microprocessor; and a radio frequency modulator;

wherein the motion detection circuit is configured to direct a motion detected signal to the microprocessor upon the transmitting unit being moved in a predetermined manner, the microprocessor is configured to generate an encoded message that includes an identification code denoting a type of transmitter responsive to the motion detected signal, and the radio frequency modulator is configured to modulate the encoded message at a transmitting frequency; and the microprocessor is configured to cease generating the encoded message upon the motion detection circuit not generating a motion detected signal for a predetermined time.

10. The transmitting unit of claim 9, wherein the motion detecting circuit includes a mass attached to a flexible electrical contact, wherein the mass is configured to move the flexible electrical contact to make contact with at least one rigid electrical contact upon a motion of a predetermined magnitude.

11. The transmitting unit of claim 9, wherein the motion detecting circuit includes an accelerometer.

12. The transmitting unit of claim 9, wherein the motion detecting circuit includes wheel revolution sensor.

13. The transmitting unit of claim 9, wherein the motion detecting circuit includes a substantially round electrically conductive mass between a first and second fixed electrical contacts, wherein the mass is configured to roll and make contact with both of the fixed electrical contacts upon a motion of a predetermined magnitude and direction.

14. The transmitting unit of claim 9, wherein the transmitting unit further includes a source of electrical power that includes a battery coupled to the transmitting unit.

15. The transmitting unit of claim 14, wherein the transmitting unit further includes a source of electrical power that includes an energy harvesting device.

16. The transmitting unit of claim 15, wherein the energy harvesting device is an electro-mechanical generator.

17. The transmitting unit of claim 15, wherein the energy harvesting device includes a photo-voltaic cell.

18. The transmitting unit of claim 15, further including a voltage leveling circuit.

19. The transmitting unit of claim 9, wherein the encoded message is transmitted according to a varying schedule.

20. The transmitting unit of claim 9, wherein the transmitting unit further includes a mechanical fastener.

21. The transmitting unit of claim 20, wherein the mechanical fastener affixes the transmitter unit to a bicycle.

22. The transmitting unit of claim 20, wherein the mechanical fastener affixes the transmitter unit to a person.

23. The transmitting unit of claim 9, further including a disable switch configured to cause the microprocessor to cease generating the encoded message.

24. A receiving unit, comprising:

a radio frequency receiver;

a microprocessor; and an output, the microprocessor is configured to cause the radio frequency receiver to transition from a power conservation state to an operational power state according to a predetermined schedule, the radio frequency receiver is configured to receive the encoded message at a transmitted frequency, the microprocessor is further configured to determine an identification code within the encoded message, and the output is configured to alert a user of the presence of a transmitting unit corresponding to the predetermined identification code.

25. The receiving unit of claim 24, wherein the output of an audible output.

26. The receiving unit of claim 24, wherein the output is a visual output.

27. The receiving unit of claim 24, wherein the radio frequency receiver is configured to transition from an operational power state to a power conservation state for a predetermined time.

28. The receiving unit of claim 24, wherein the radio frequency receiver is configured to transition from an operational power state to a power conservation state responsive to a recently received encoded message.

29. The receiving unit of claim 24, wherein the receiving unit further includes a source of electrical power that includes a battery coupled to the receiving unit.

30. The receiving unit of claim 24, wherein the receiving unit further includes a source of electrical power that includes an energy harvesting device.

31. The receiving unit of claim 24, wherein the energy harvesting device includes a photo- voltaic cell.

32. The receiving unit of claim 24, wherein the receiving unit further includes a mechanical fastener.

33. The receiving unit of claim 24, wherein the mechanical fastener affixes the transmitter unit to an automobile.

34. The receiving unit of claim 24, further including a motion detection circuit configured to cause the radio frequency receiver to transition from a power conservation state to an operational power state.

35. The receiving unit of claim 24, further including a voltage leveling circuit.

* * * * *